(12) United States Patent
Miyazawa et al.

(10) Patent No.: US 10,777,148 B2
(45) Date of Patent: Sep. 15, 2020

(54) IMAGE SIGNAL LUMINANCE PROCESSING METHOD, DEVICE AND DISPLAY APPARATUS

(71) Applicant: Sony Corporation, Tokyo (JP)

(72) Inventors: Kuninori Miyazawa, Kanagawa (JP); Hidetaka Honji, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/743,436

(22) PCT Filed: Jul. 22, 2016

(86) PCT No.: PCT/JP2016/071519
§ 371 (c)(1),
(2) Date: Jan. 10, 2018

(87) PCT Pub. No.: WO2017/022513
PCT Pub. Date: Feb. 9, 2017

(65) Prior Publication Data
US 2018/0204528 A1    Jul. 19, 2018

(30) Foreign Application Priority Data

Jul. 31, 2015  (JP) .................................. 2015-152635

(51) Int. Cl.
*G09G 3/34* (2006.01)
*G09G 3/20* (2006.01)
(Continued)

(52) U.S. Cl.
CPC ........... *G09G 3/3426* (2013.01); *G06T 5/009* (2013.01); *G09G 3/20* (2013.01); *G09G 3/3208* (2013.01); *G09G 3/34* (2013.01); *G09G 3/3413* (2013.01); *G09G 3/36* (2013.01); *H04N 5/20* (2013.01); *G06T 2207/20208* (2013.01);
(Continued)

(58) Field of Classification Search
None
See application file for complete search history.

(56) References Cited

U.S. PATENT DOCUMENTS

2002/0000415 A1    1/2002  Costello et al.
2003/0053690 A1    3/2003  Trifonov et al.
(Continued)

FOREIGN PATENT DOCUMENTS

CN    101083860 A    12/2007
CN    102903318 A    1/2013
(Continued)

OTHER PUBLICATIONS

International Search Report for PCT/JP2016/071519, dated Sep. 20, 2016 (3 pgs).
(Continued)

*Primary Examiner* — Jason A Pringle-Parker
(74) *Attorney, Agent, or Firm* — Lerner, David, Littenberg, Krumholz & Mentlik, LLP

(57) ABSTRACT

An image signal processing device of the present disclosure includes a luminance correction section that performs, on a basis of information on a maximum output luminance value in a display section, luminance correction on an image signal to be supplied to the display section, the maximum output luminance value being variable.

14 Claims, 30 Drawing Sheets

(51) Int. Cl.
*G09G 3/3208* (2016.01)
*G09G 3/36* (2006.01)
*H04N 5/20* (2006.01)
*G06T 5/00* (2006.01)

(52) U.S. Cl.
CPC ........... *G09G 2320/0276* (2013.01); *G09G 2320/0285* (2013.01); *G09G 2320/0646* (2013.01); *G09G 2340/06* (2013.01)

(56) References Cited

U.S. PATENT DOCUMENTS

| | | |
|---|---|---|
| 2004/0036704 A1 | 2/2004 | Han et al. |
| 2006/0033749 A1* | 2/2006 | Yamada .................. G09G 3/20 |
| | | 345/595 |
| 2007/0296354 A1* | 12/2007 | Okabe ................ G09G 3/3426 |
| | | 315/307 |
| 2010/0277492 A1 | 11/2010 | Frederick et al. |
| 2013/0027437 A1 | 1/2013 | Gu |
| 2013/0120656 A1 | 5/2013 | Wilson et al. |
| 2013/0293534 A1 | 11/2013 | Sato et al. |
| 2014/0210847 A1 | 7/2014 | Knibbeler et al. |
| 2015/0154919 A1 | 6/2015 | Ooshima |
| 2016/0080714 A1 | 3/2016 | Tsukagoshi |
| 2016/0173811 A1* | 6/2016 | Oh ........................ H04N 19/70 |
| | | 725/116 |
| 2018/0199050 A1 | 7/2018 | Yamamoto et al. |

FOREIGN PATENT DOCUMENTS

| | | |
|---|---|---|
| CN | 103384338 A | 11/2013 |
| CN | 104517268 A | 4/2015 |
| CN | 104584113 A | 4/2015 |
| EP | 0684729 A3 | 12/1996 |
| GB | 2181015 A | 4/1987 |
| JP | 2004088732 A | 3/2004 |
| JP | 2008219289 A | 9/2008 |
| JP | 2013218215 A | 10/2013 |
| JP | 2013255201 A | 12/2013 |
| JP | 2016082498 A | 5/2016 |
| WO | 2014043005 A1 | 3/2014 |
| WO | 2014130343 A2 | 8/2014 |
| WO | 2014178286 A1 | 11/2014 |
| WO | 2014203747 A1 | 12/2014 |
| WO | 2015034188 A1 | 3/2015 |
| WO | 2015084966 A2 | 6/2015 |
| WO | 2015085130 A2 | 6/2015 |

OTHER PUBLICATIONS

Partial Supplemetary European Search Report for Application No. EP16832792 dated Mar. 7, 2019, 20 pages.
Extended European Search Report including Written Opinion for Application No. EP16832792.2, dated Jun. 18, 2019, pp. 1-27.
Chinese Office Action for CN2016800432765 dated Feb. 25, 2020; 8 pages.
Japanese Office Action for JP2017532498 dated Jun. 30, 2020, 4 pages.

* cited by examiner

[FIG. 1]
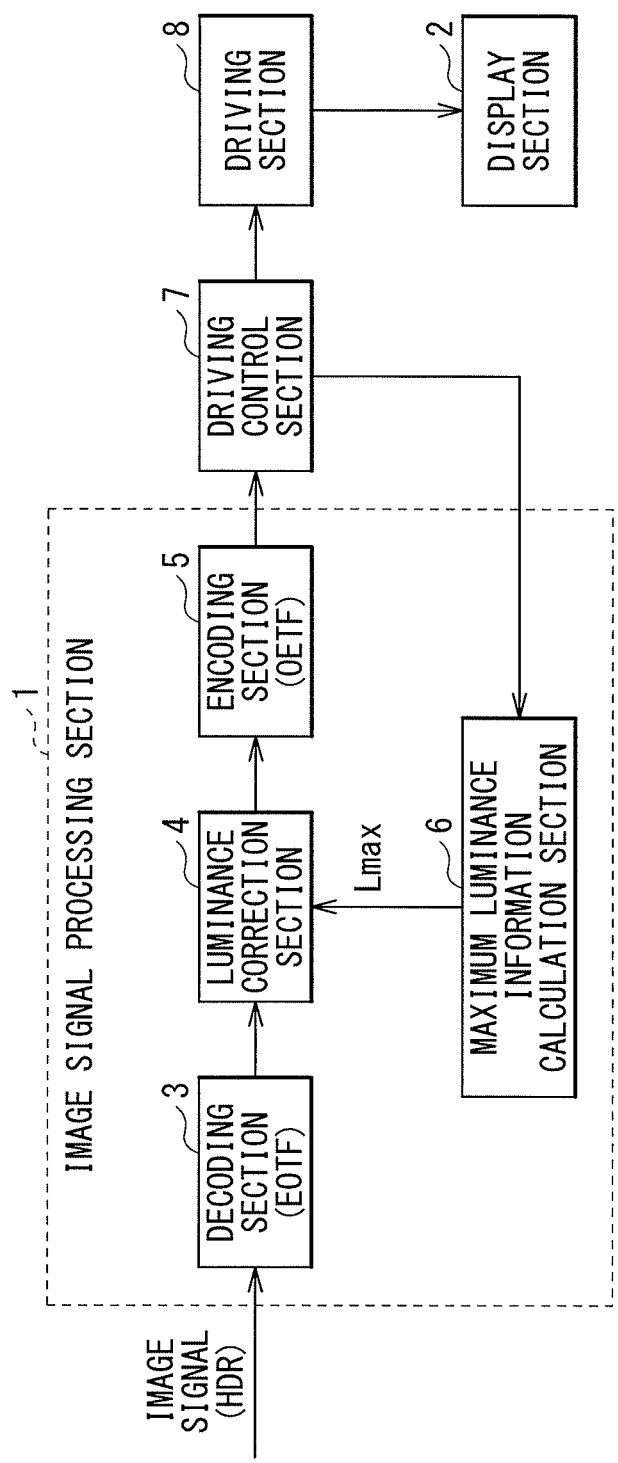

[ FIG. 2 ]
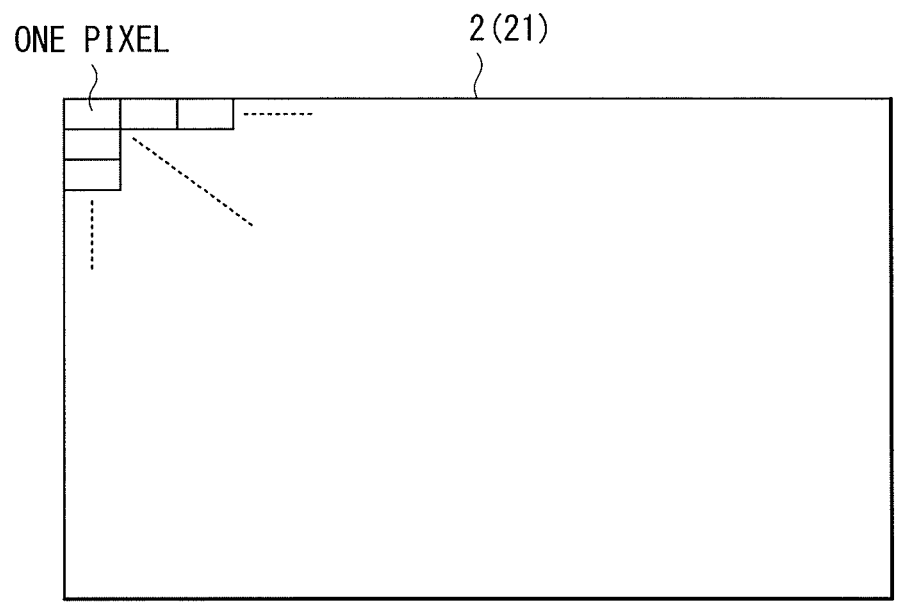
[ FIG. 3 ]
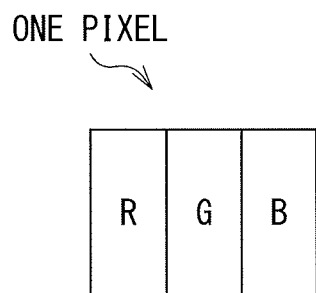
[ FIG. 4 ]
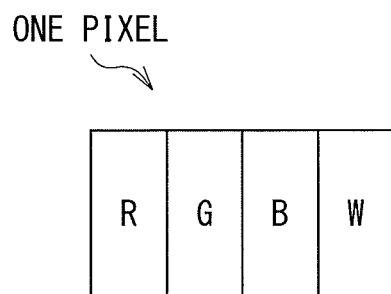

[ FIG. 5 ]
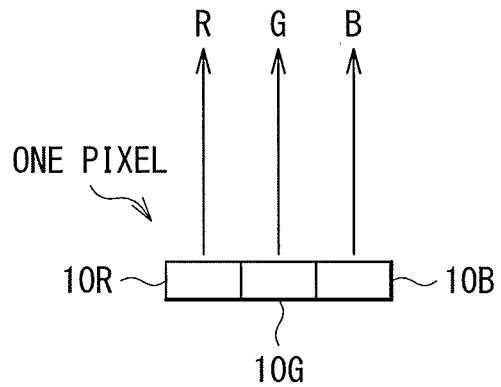
[ FIG. 6 ]
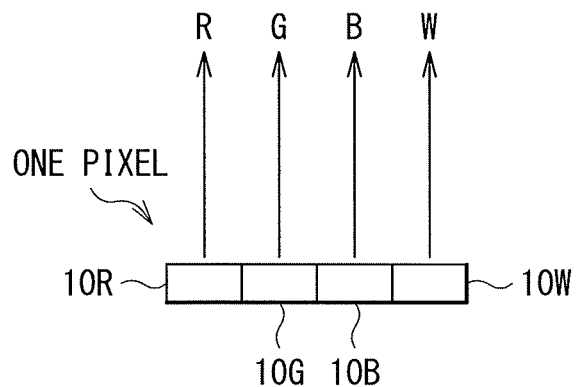
[ FIG. 7 ]
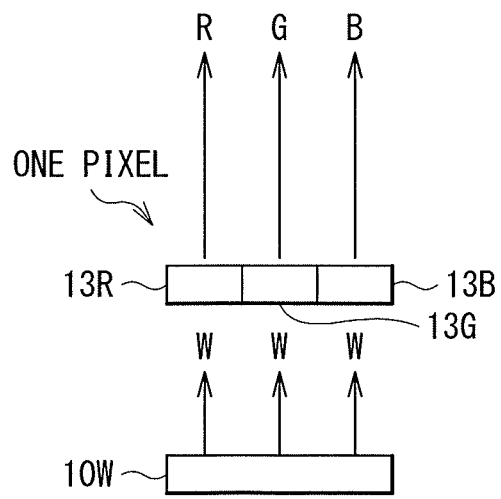

[ FIG. 8 ]
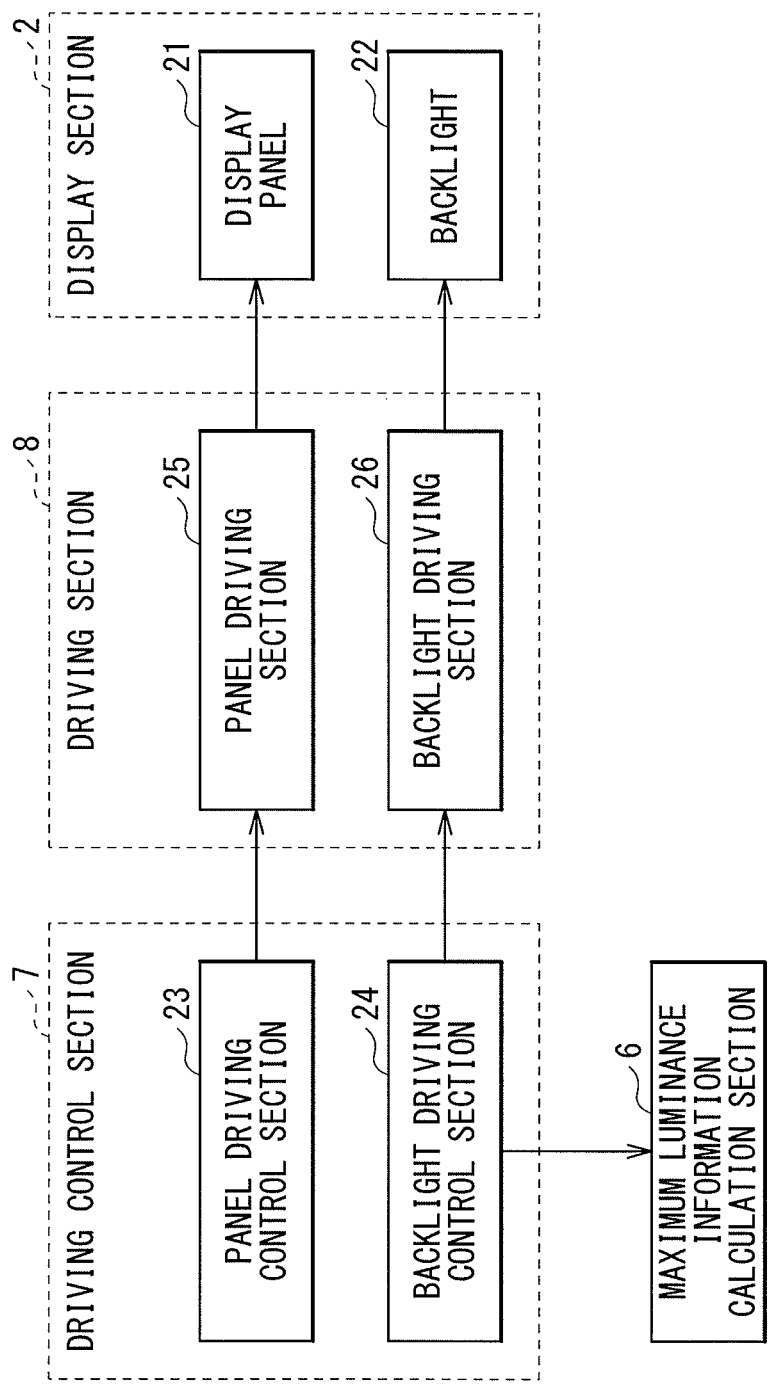

[ FIG. 9 ]
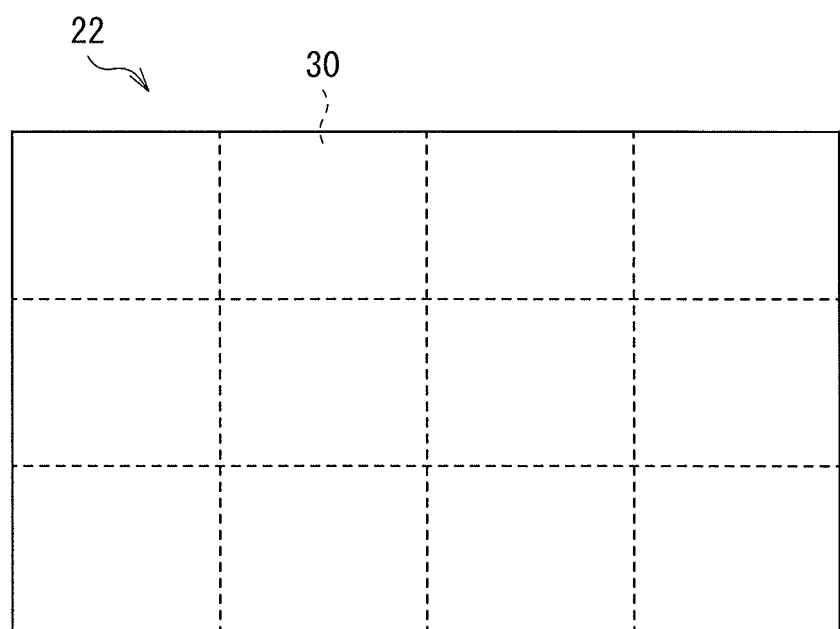

[ FIG. 10 ]
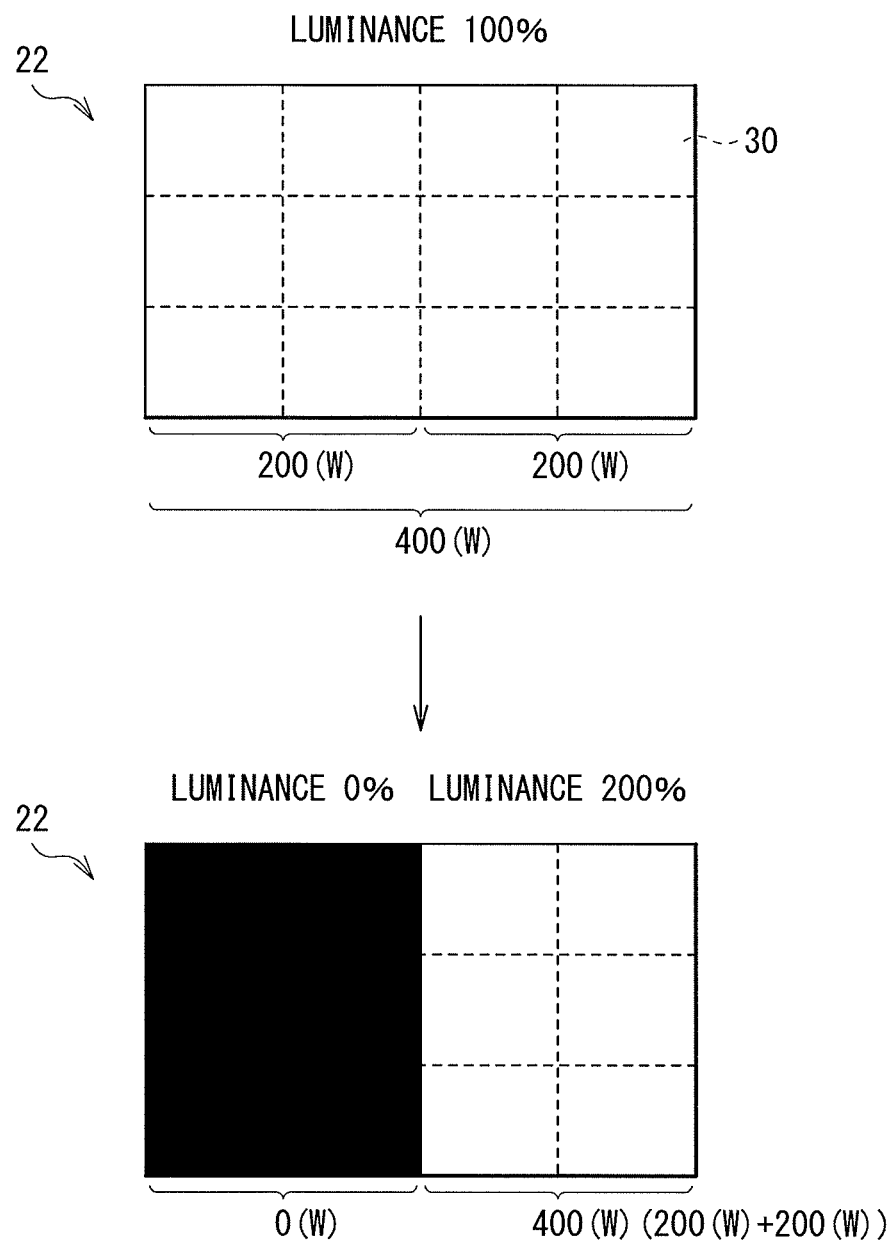

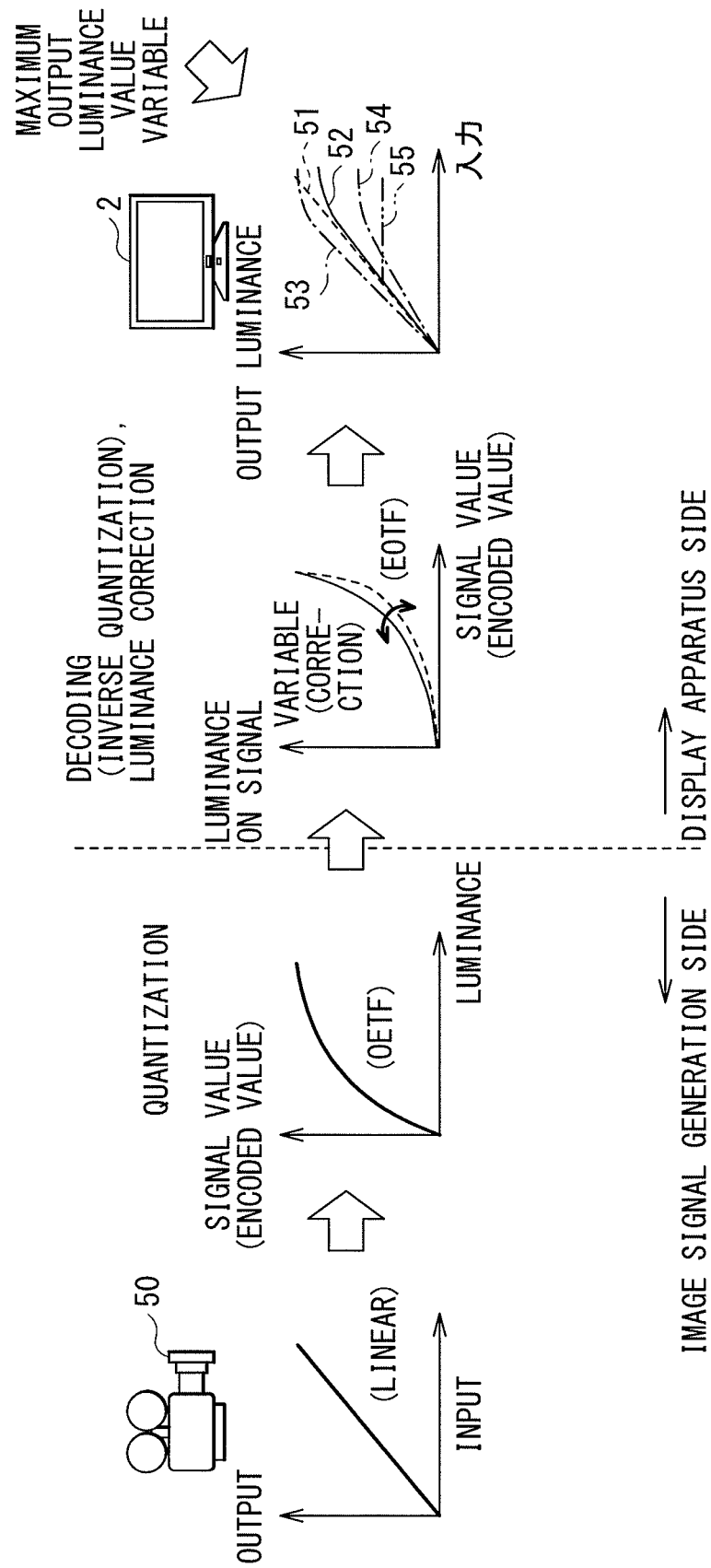
[ FIG. 11 ]

[ FIG. 12 ]
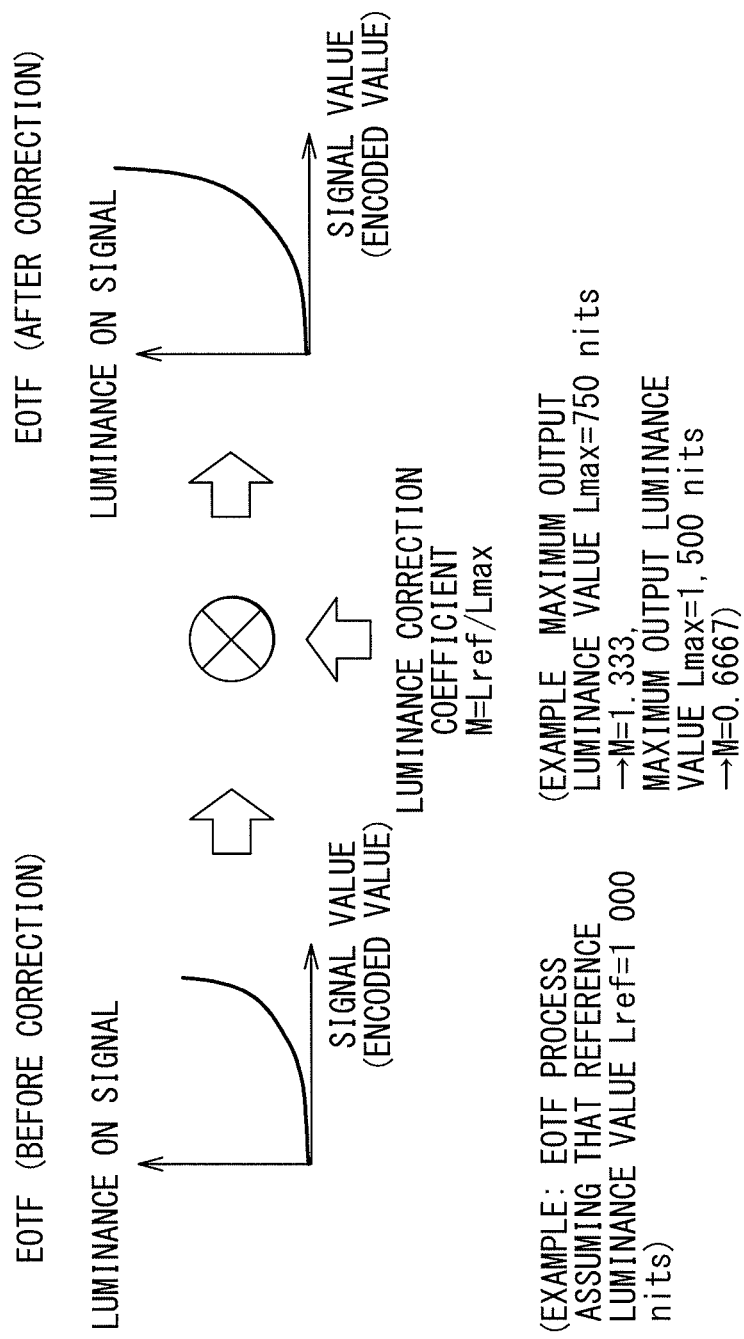

[FIG. 13]
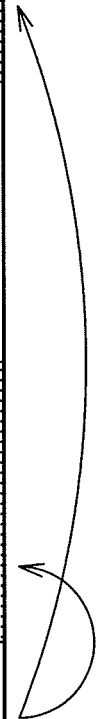
| Lmax |
|---|
| 750 |
| INPUT | HDR EOTF | ↓Lref<br>1<br>(1) AFTER EOTF CORRECTION | ↓Lref<br>1000<br>NORMALIZED EOTF' | M<br>1.333<br>(2) AFTER EOTF CORRECTION |
|---|---|---|---|---|
| 0.0% | 0.0000 | 0.0000% | 0.000000% | 0.0000% |
| 12.5% | 0.0595 | 0.0079% | 0.005950% | 0.0079% |
| 25.0% | 0.5160 | 0.0688% | 0.051600% | 0.0688% |
| 50.0% | 9.2315 | 1.2309% | 0.923150% | 1.2309% |
| 75.0% | 98.380 | 13.117% | 9.838000% | 13.117% |
| 100.0% | 1000.0 | 133.33% | 100.000% | 133.33% |
(1) = HDR EOTF/Lmax
(AS Lref=1, POSSIBLE TO PERFORM ONLY DIVISION)
(2) = EOTF'*M
= (HDR EOTF/Lref)*(Lref/Lmax)
(PREPARE EOTF' NORMALIZED BY ARBITRARY REFERENCE LUMINANCE VALUE Lref AND MULTIPLY EOTF' BY M)

[ FIG. 14 ]
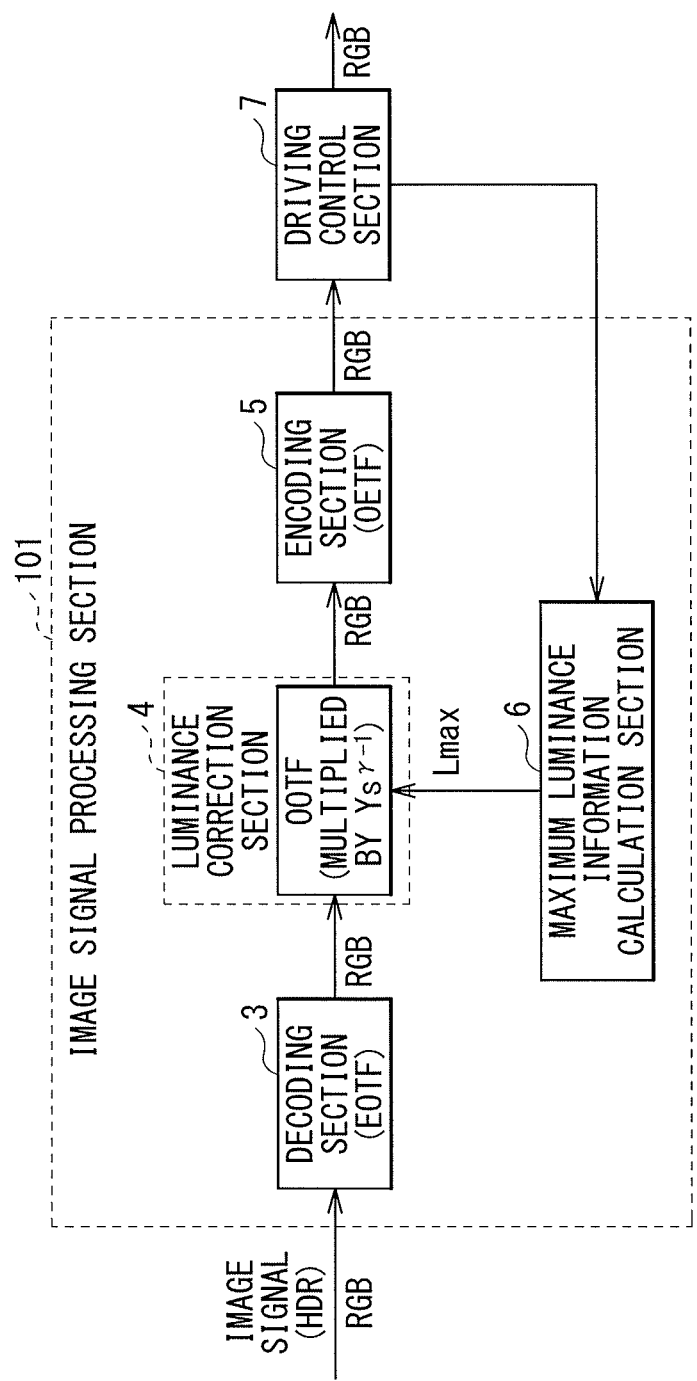

[ FIG. 15 ]
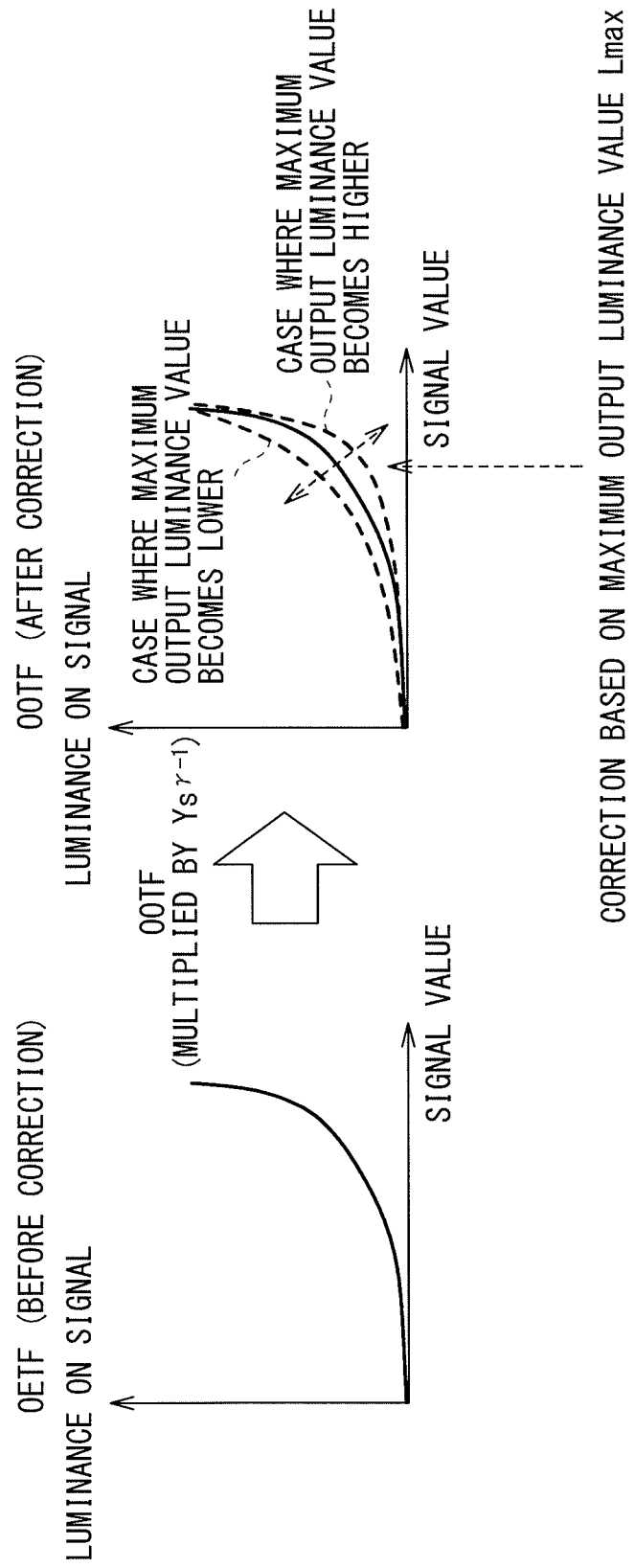

[ FIG. 16 ]
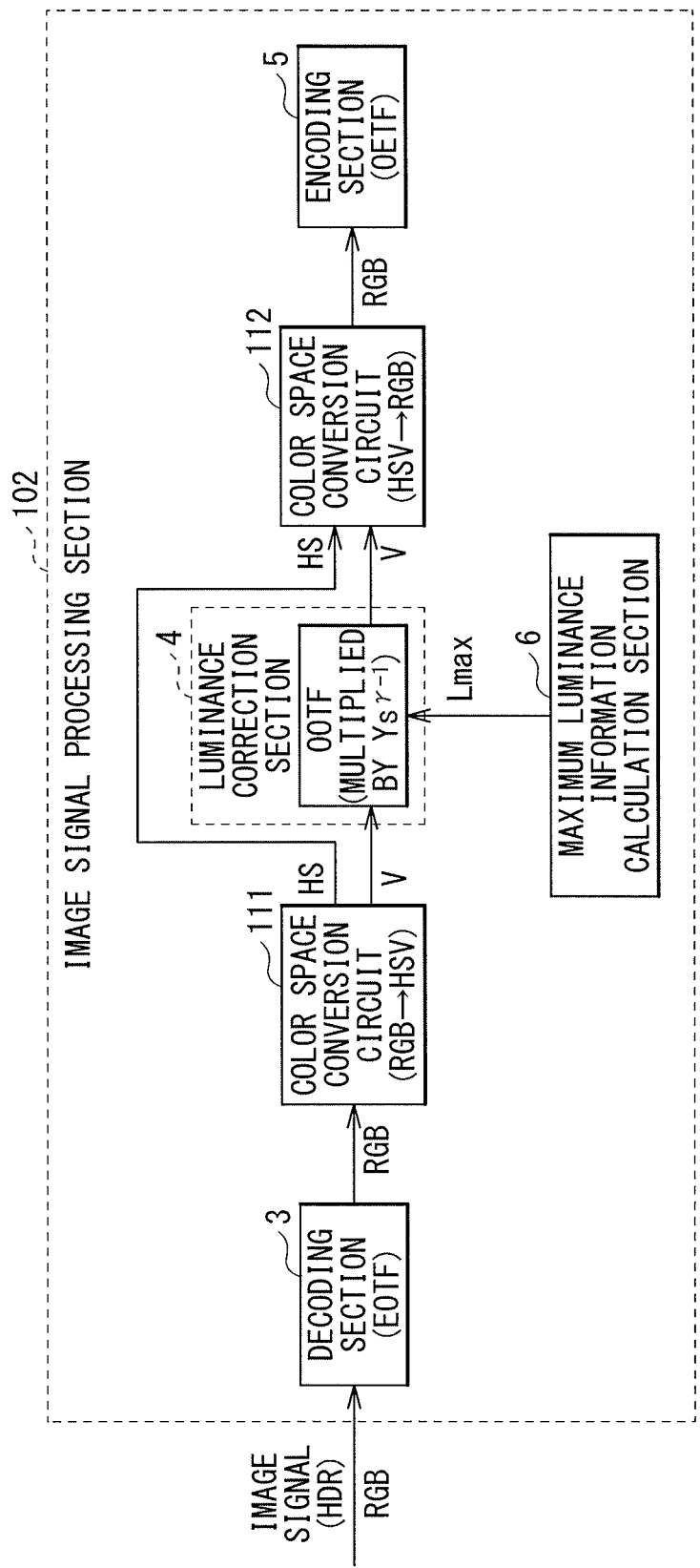

[ FIG. 17 ]

| E' | FD1000 | FD1000' | Test2000' | Test2000 |
|---|---|---|---|---|
| 0 | 0 | 0 | 0 | 0 |
| 0.01 | 0.004241 | 4.24E-06 | 1.15E-06 | 0.002304 |
| 0.02 | 0.022383 | 2.24E-05 | 7.24E-06 | 0.014488 |
| 0.03 | 0.059231 | 5.92E-05 | 2.12E-05 | 0.042478 |
| 0.04 | 0.11814 | 0.000118 | 4.56E-05 | 0.09112 |
| 0.05 | 0.201829 | 0.000202 | 8.24E-05 | 0.164704 |
| 0.06 | 0.312621 | 0.000313 | 0.000134 | 0.267153 |
| 0.07 | 0.452574 | 0.000453 | 0.000201 | 0.402125 |
| 0.08 | 0.623549 | 0.000624 | 0.000287 | 0.573068 |
| 0.09 | 0.82725 | 0.000827 | 0.000392 | 0.783262 |
| 0.1 | 1.065257 | 0.001065 | 0.000518 | 1.035847 |
| 0.11 | 1.33905 | 0.001339 | 0.000667 | 1.333843 |
| 0.12 | 1.650021 | 0.00165 | 0.00084 | 1.680168 |
| 0.13 | 1.999487 | 0.001999 | 0.001039 | 2.077648 |
| 0.14 | 2.388701 | 0.002389 | 0.001265 | 2.529028 |
| 0.15 | 2.81886 | 0.002819 | 0.001518 | 3.03698 |
| 0.16 | 3.29111 | 0.003291 | 0.001802 | 3.604113 |
| 0.17 | 3.806553 | 0.003807 | 0.002116 | 4.232973 |
| 0.18 | 4.366249 | 0.004366 | 0.002463 | 4.926054 |
| 0.19 | 4.971222 | 0.004971 | 0.002843 | 5.685797 |
| 0.2 | 5.622461 | 0.005622 | 0.003257 | 6.514598 |
| | | | | |
| 0.89 | 489.5993 | 0.489599 | 0.454111 | 908.2225 |
| 0.9 | 522.1101 | 0.52211 | 0.487557 | 975.114 |
| 0.91 | 556.8616 | 0.556862 | 0.523551 | 1047.102 |
| 0.92 | 594.0088 | 0.594009 | 0.562289 | 1124.578 |
| 0.93 | 633.718 | 0.633718 | 0.603982 | 1207.963 |
| 0.94 | 676.1667 | 0.676167 | 0.648856 | 1297.711 |
| 0.95 | 721.5448 | 0.721545 | 0.697156 | 1394.312 |
| 0.96 | 770.0555 | 0.770055 | 0.749145 | 1498.29 |
| 0.97 | 821.9159 | 0.821916 | 0.805107 | 1610.214 |
| 0.98 | 877.3583 | 0.877358 | 0.865347 | 1730.693 |
| 0.99 | 936.6312 | 0.936631 | 0.930193 | 1860.386 |
| 1 | 1000 | 1 | 1 | 2000 |

[ FIG. 18 ]
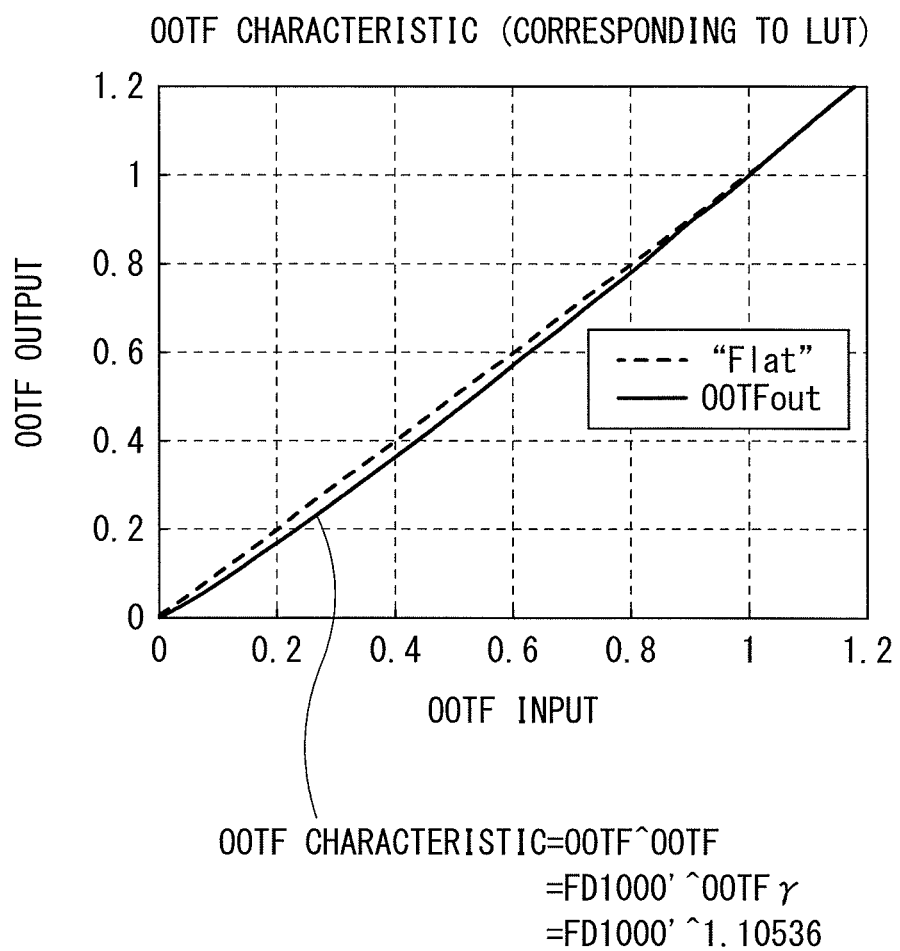

[ FIG. 19 ]
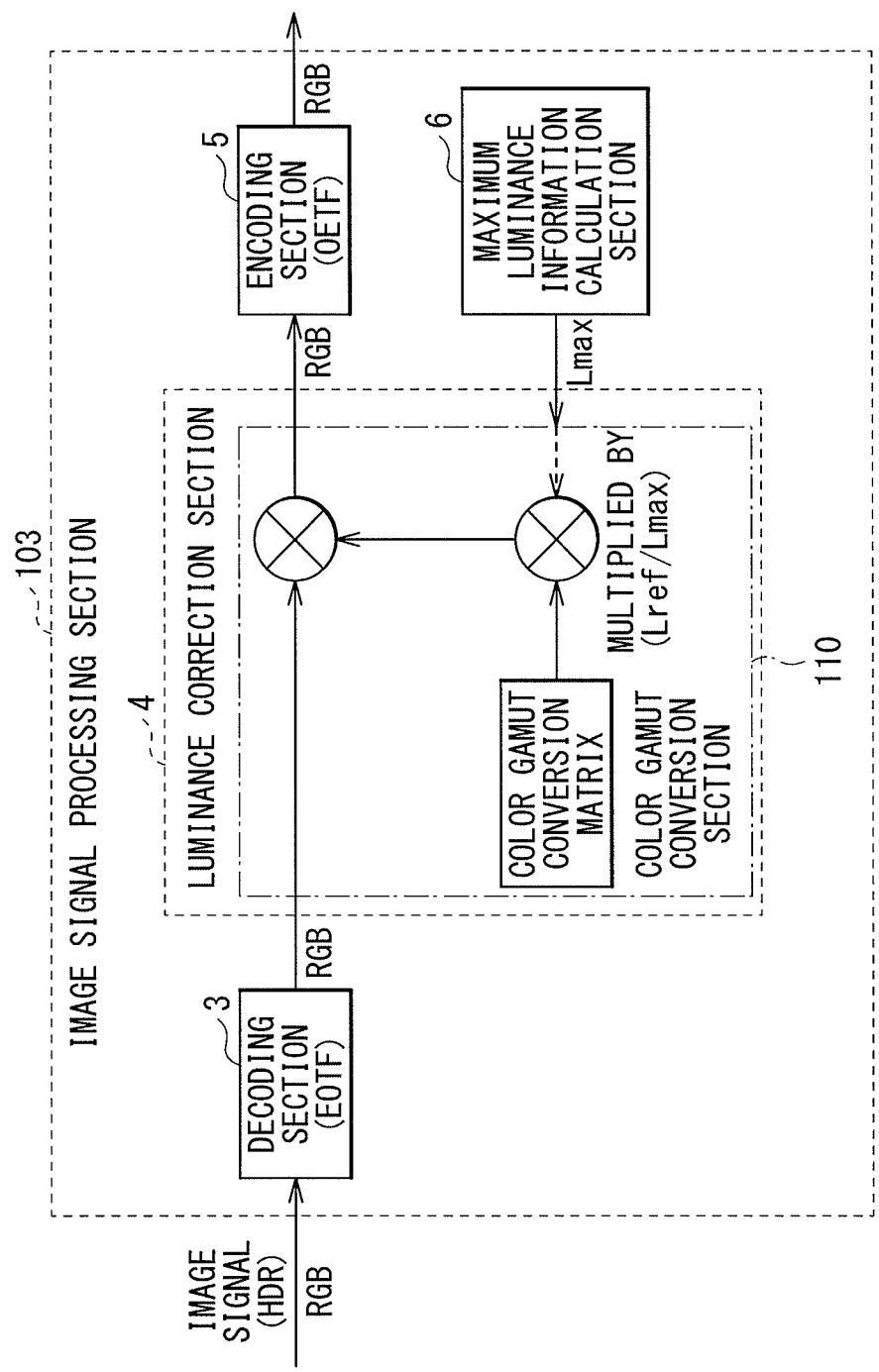

[FIG. 20]
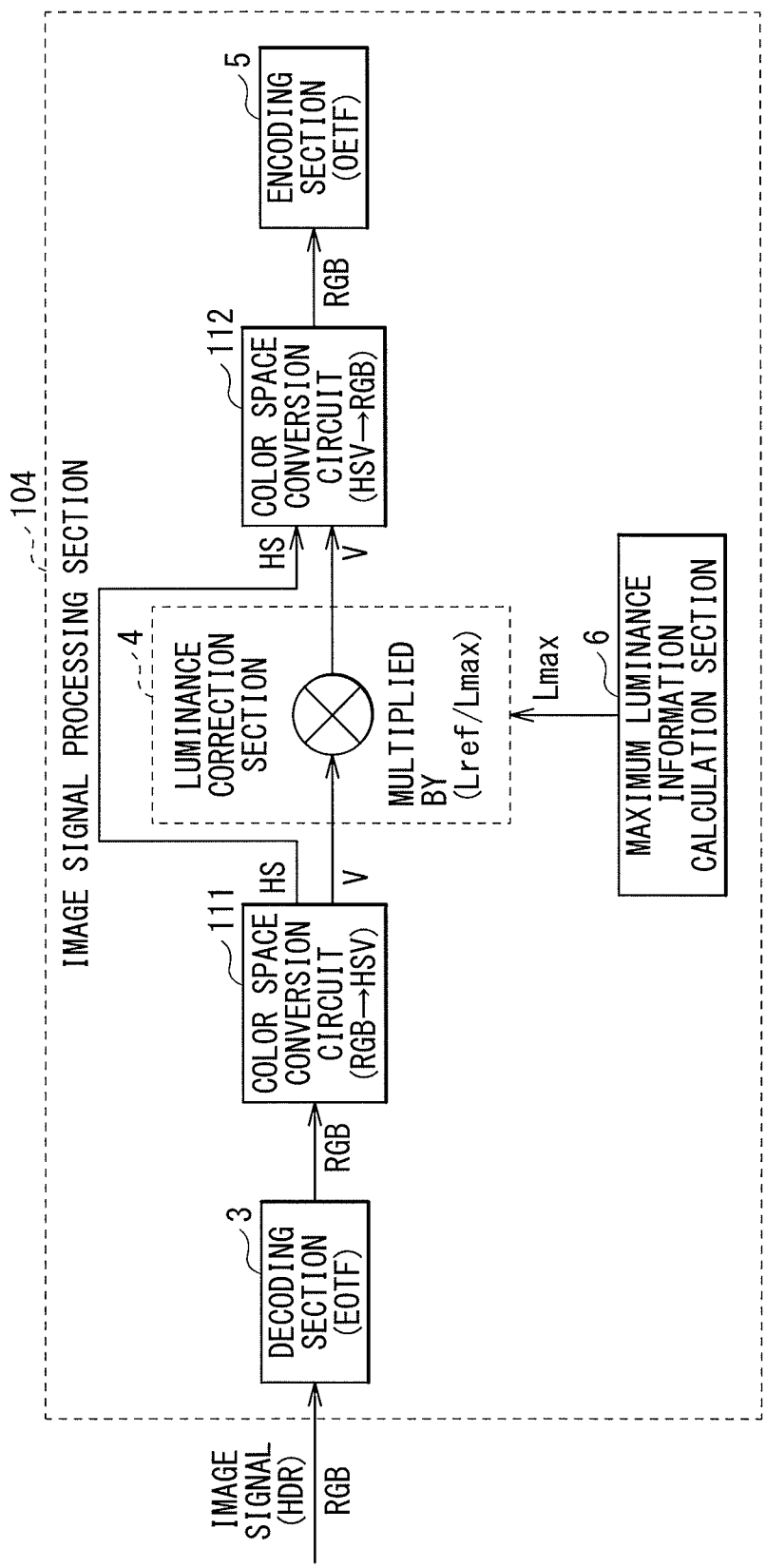

[FIG. 21]
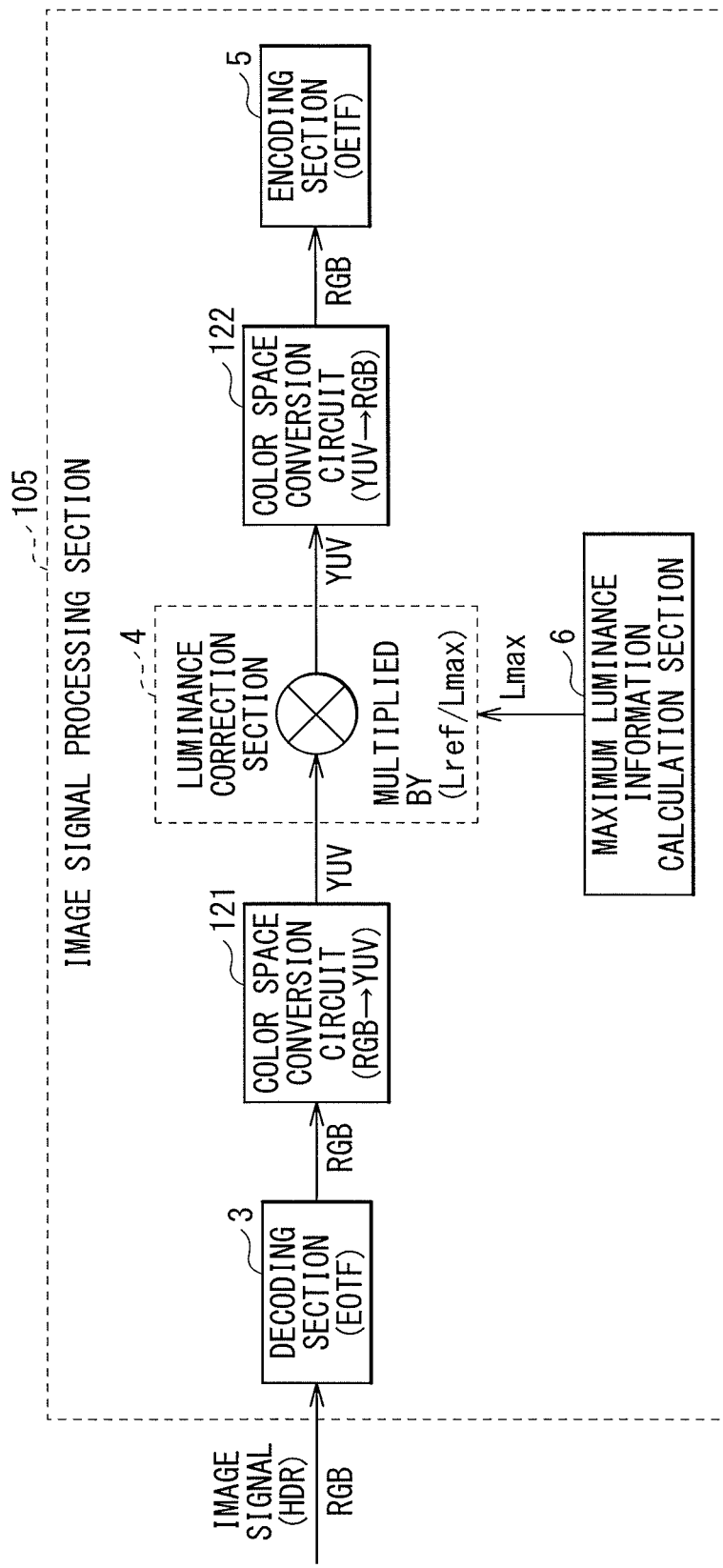

[ FIG. 22 ]
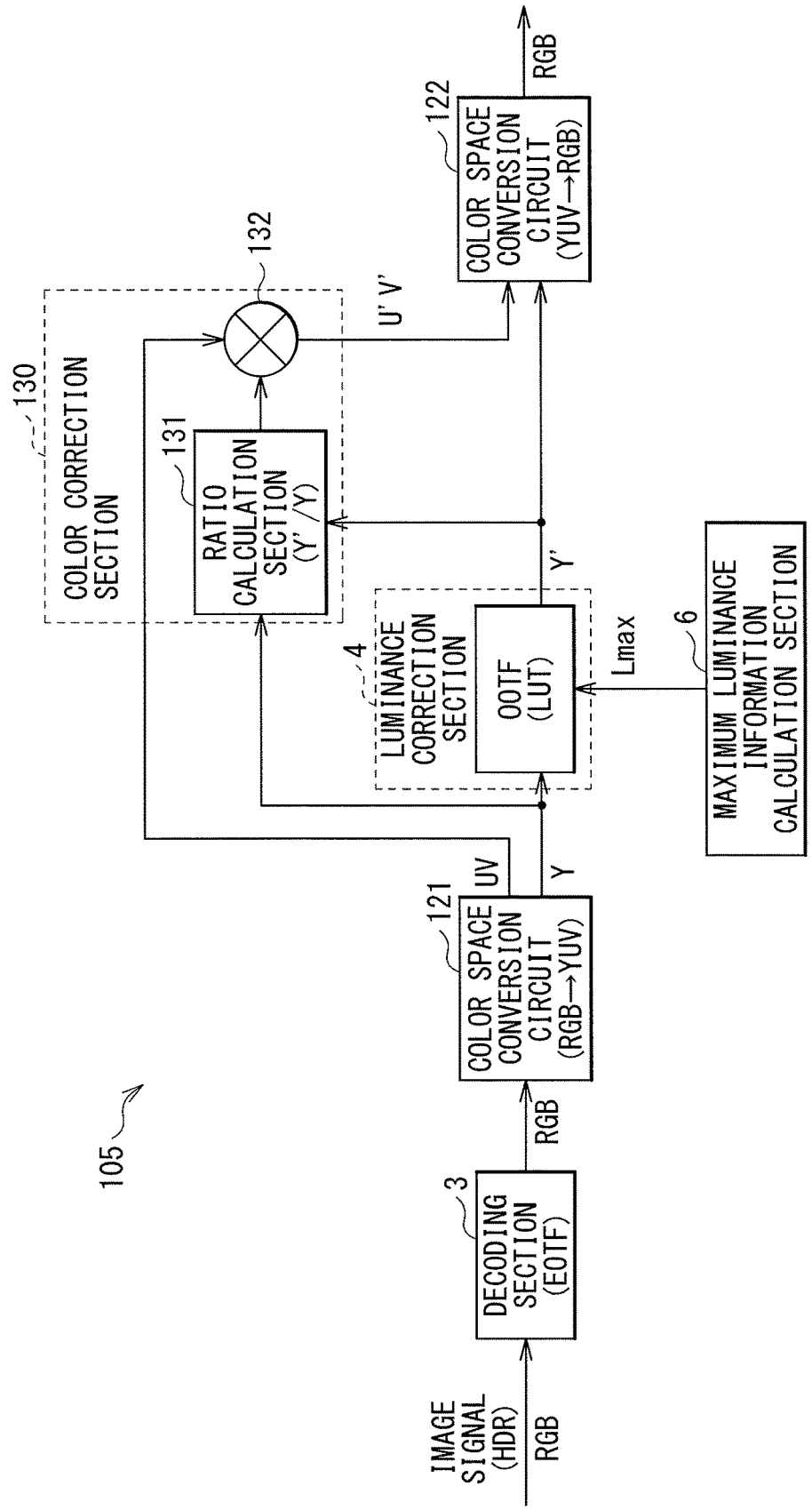

[ FIG. 23 ]
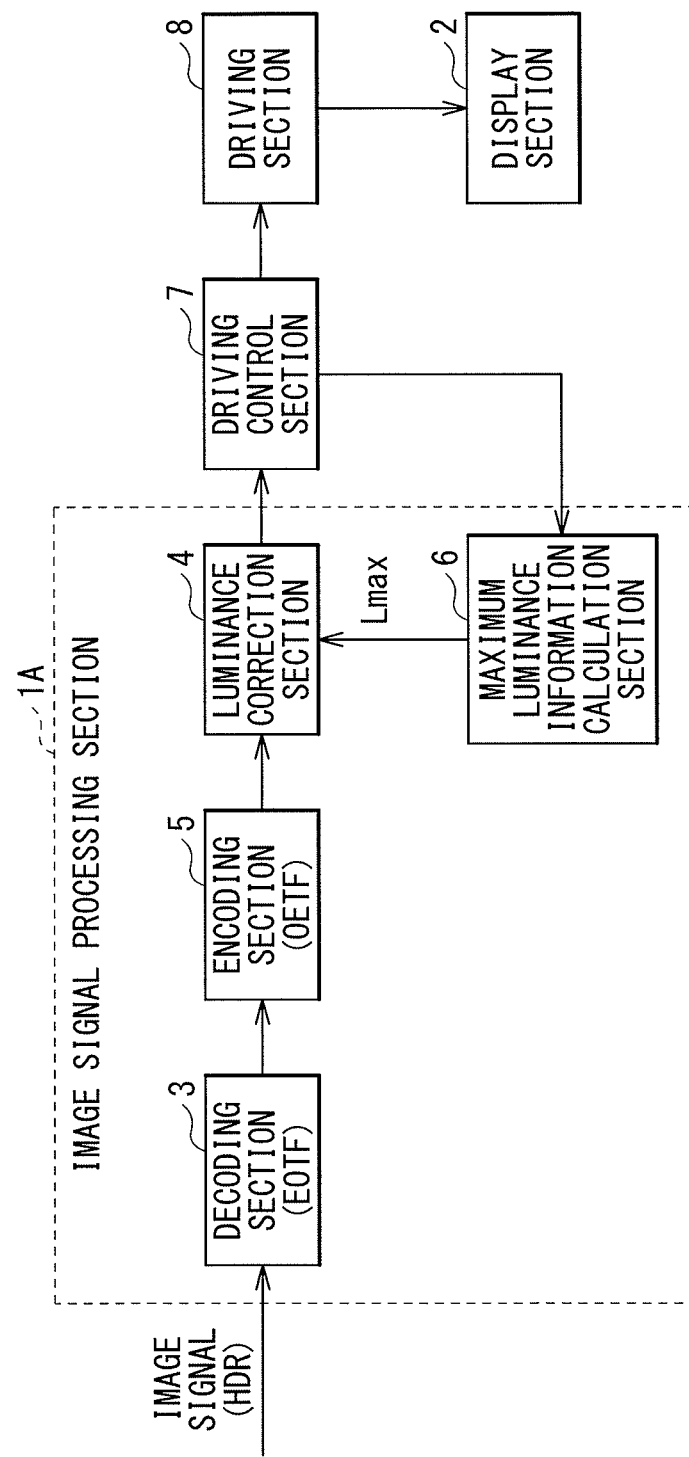

[ FIG. 24 ]
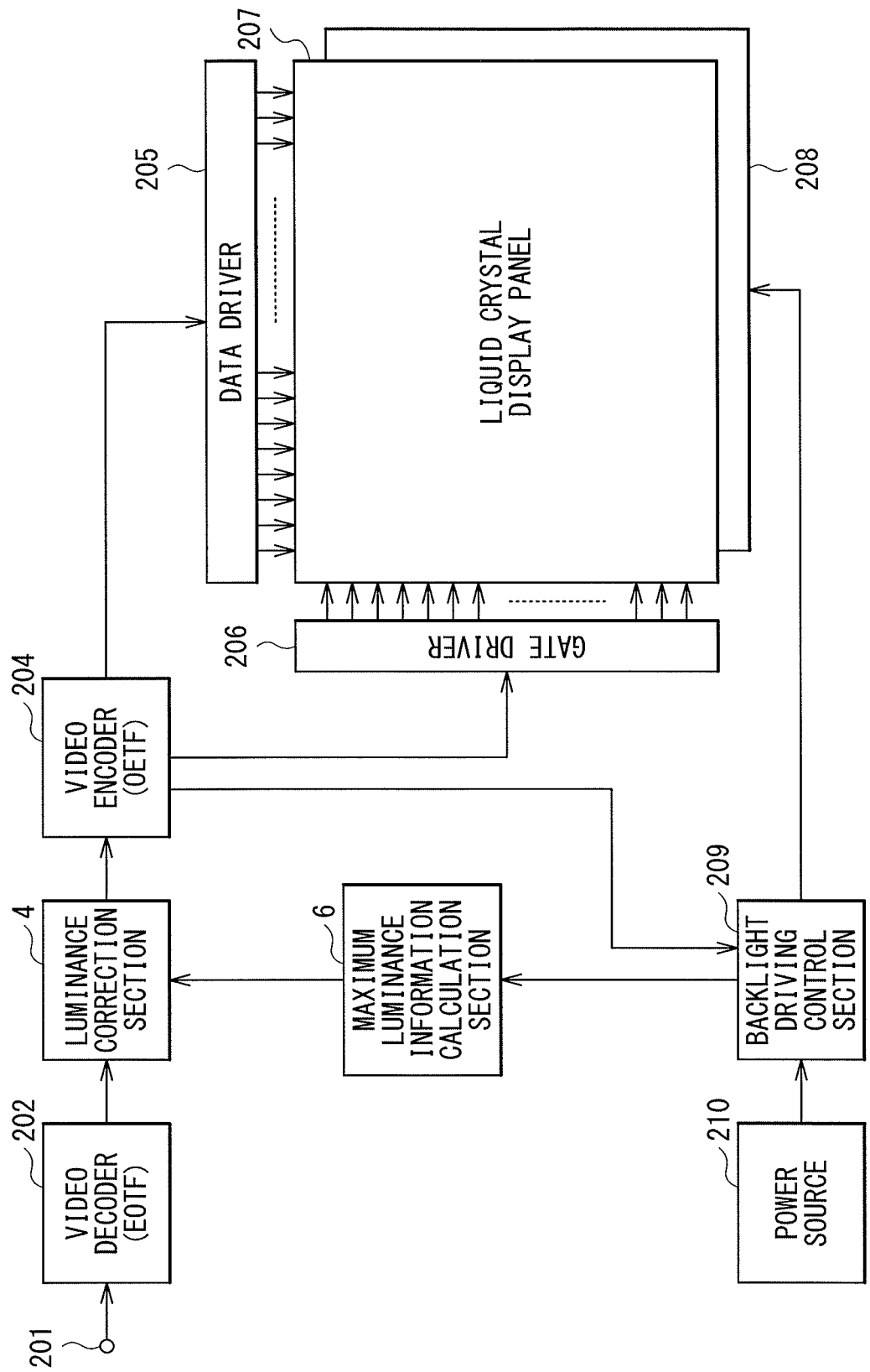

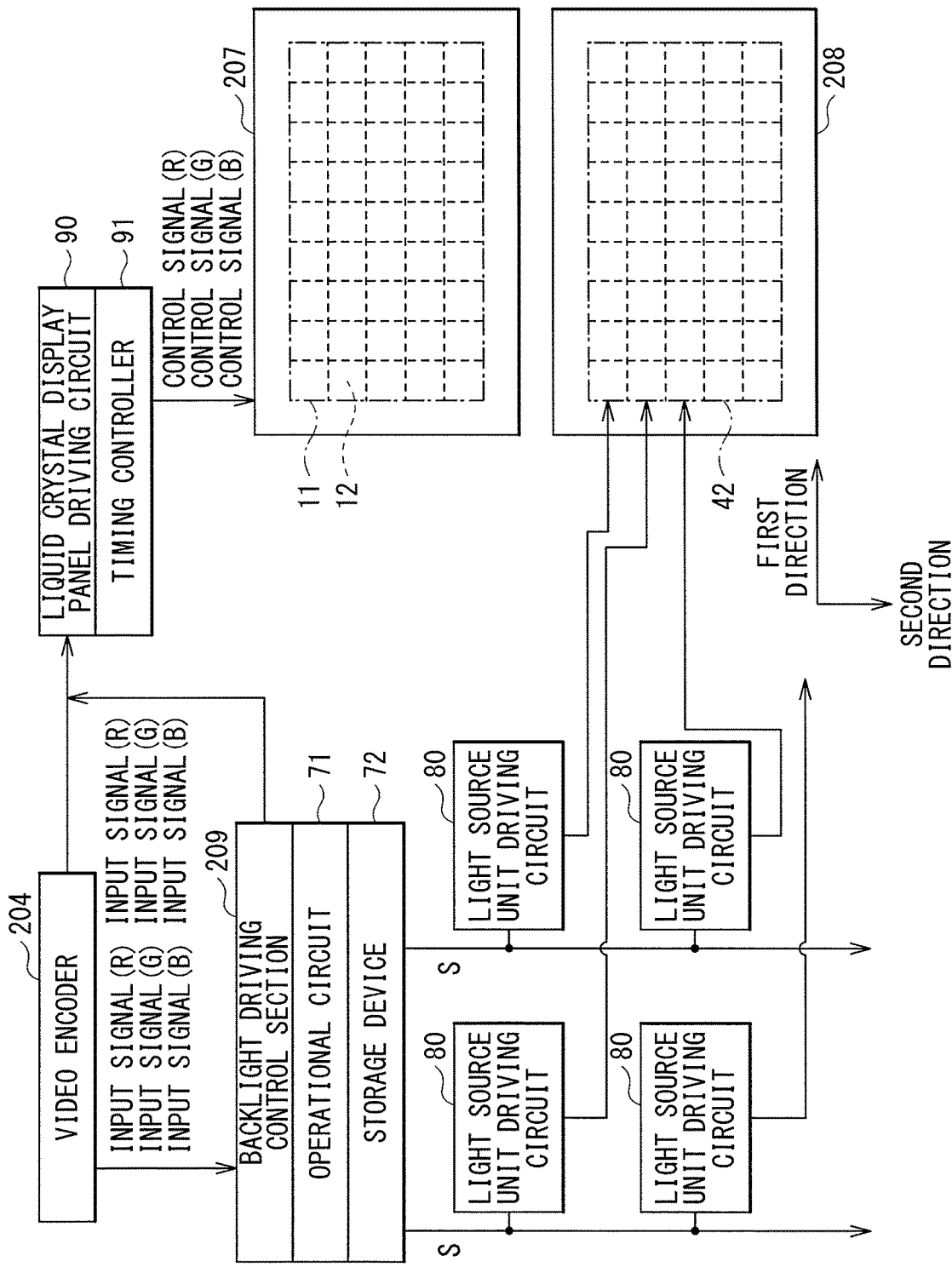
[ FIG. 25 ]

[FIG. 26]
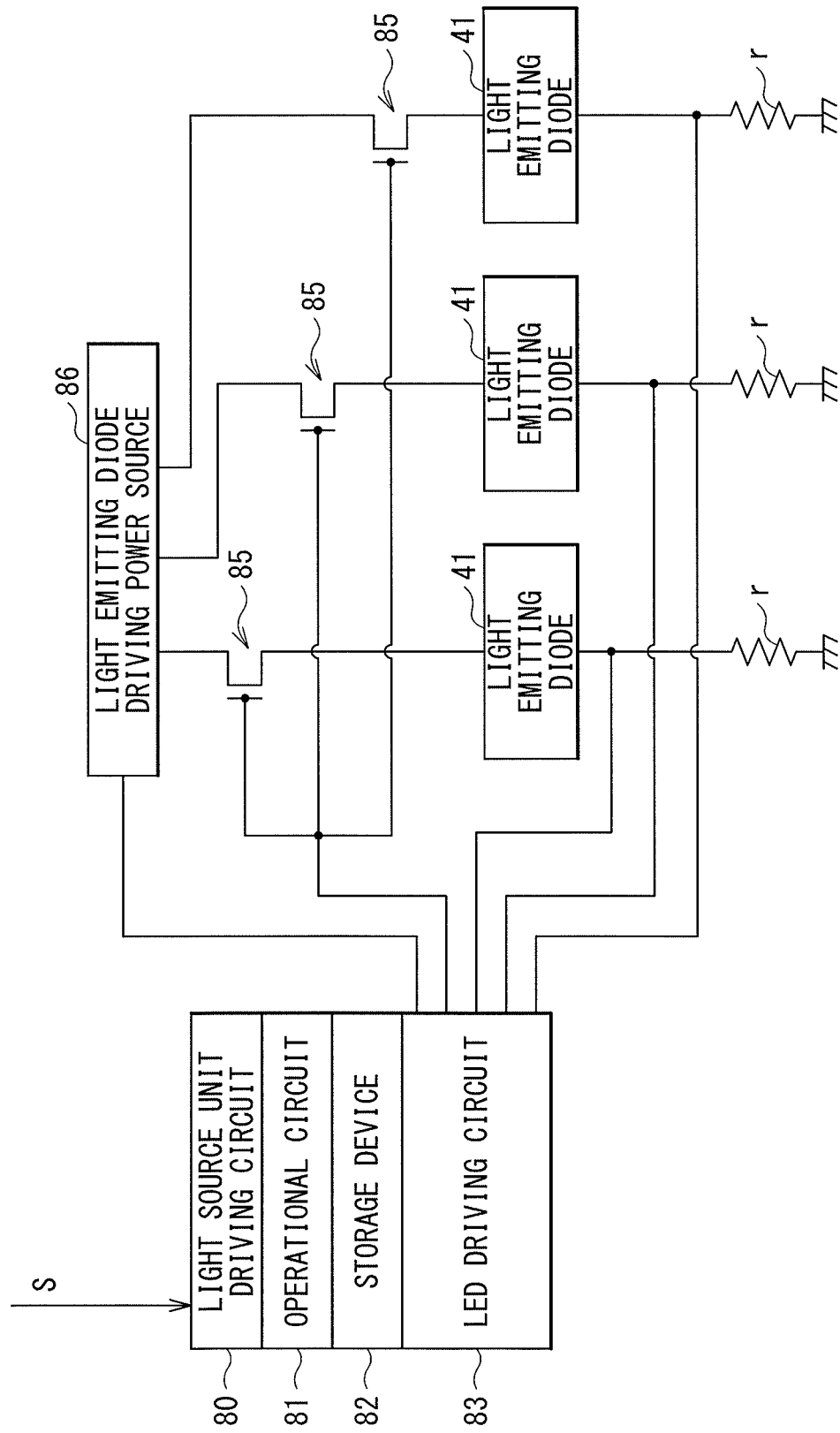

[ FIG. 27 ]
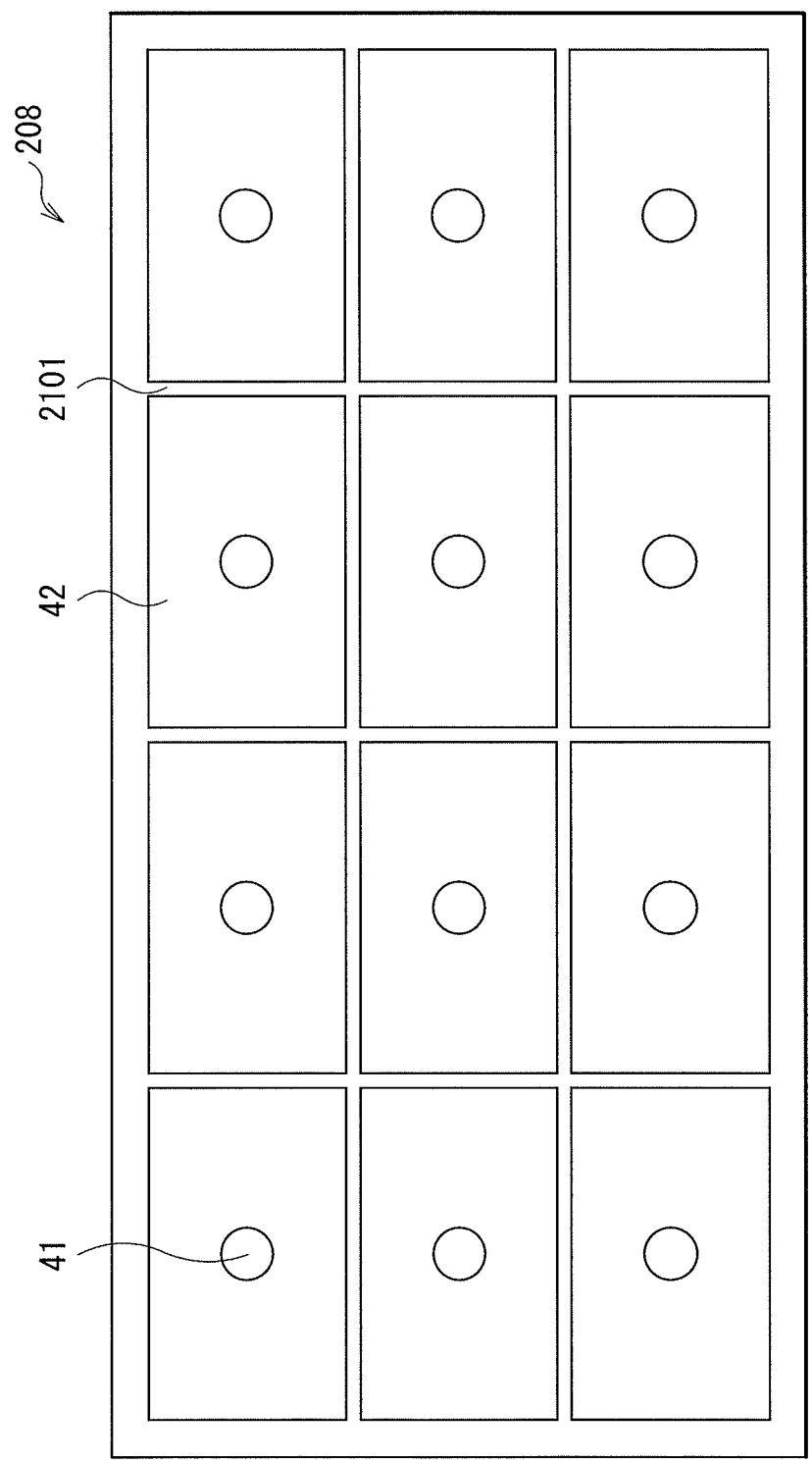

[ FIG. 28 ]
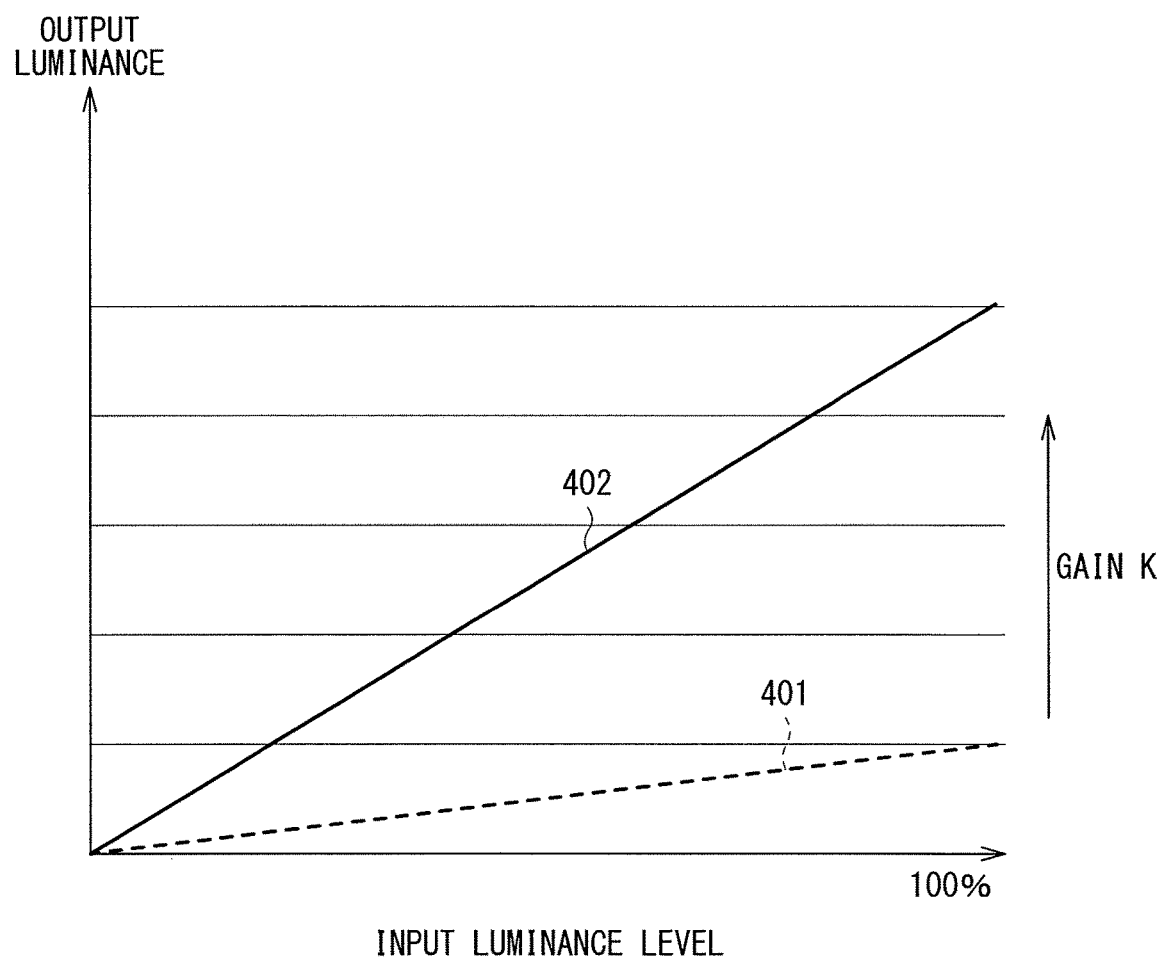

[ FIG. 29 ]
[ FIG. 30 ]

[ FIG. 31 ]
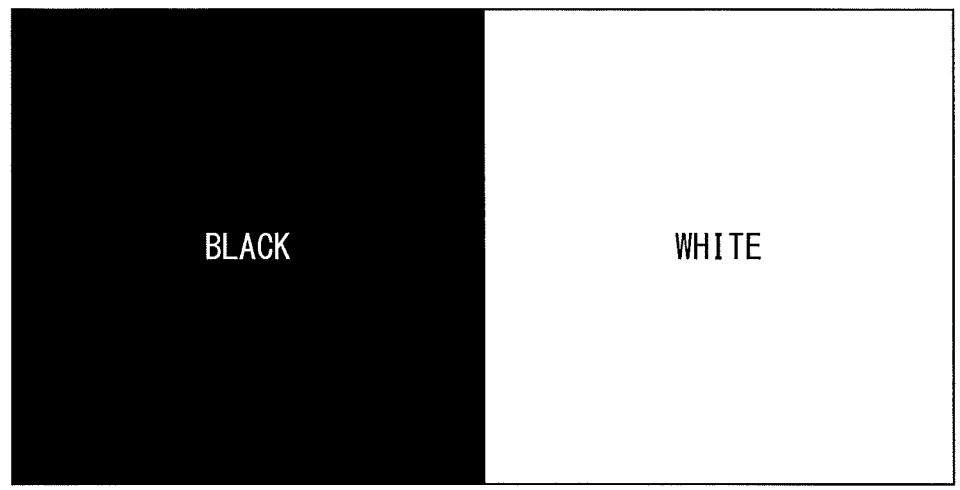

[FIG. 32]
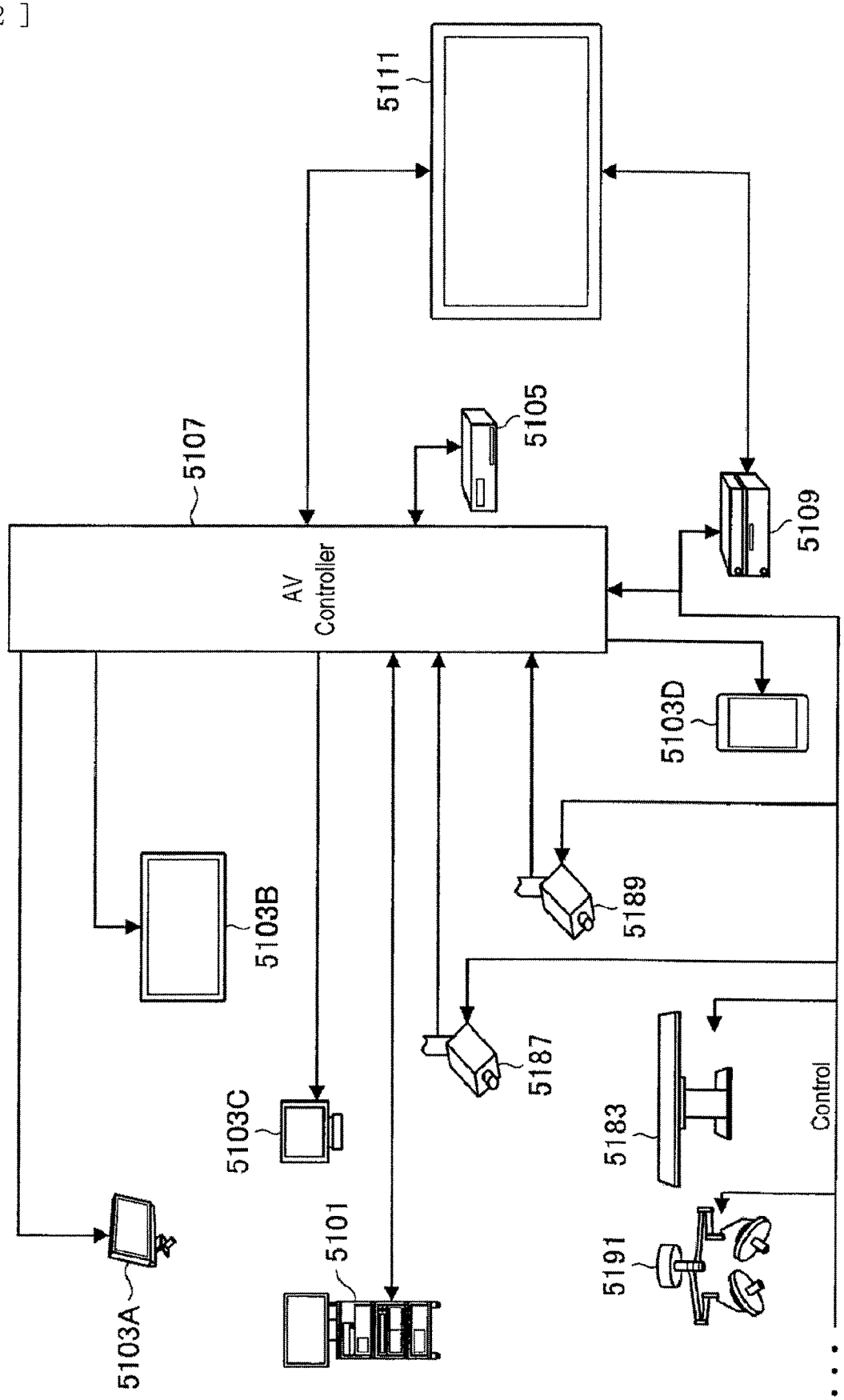

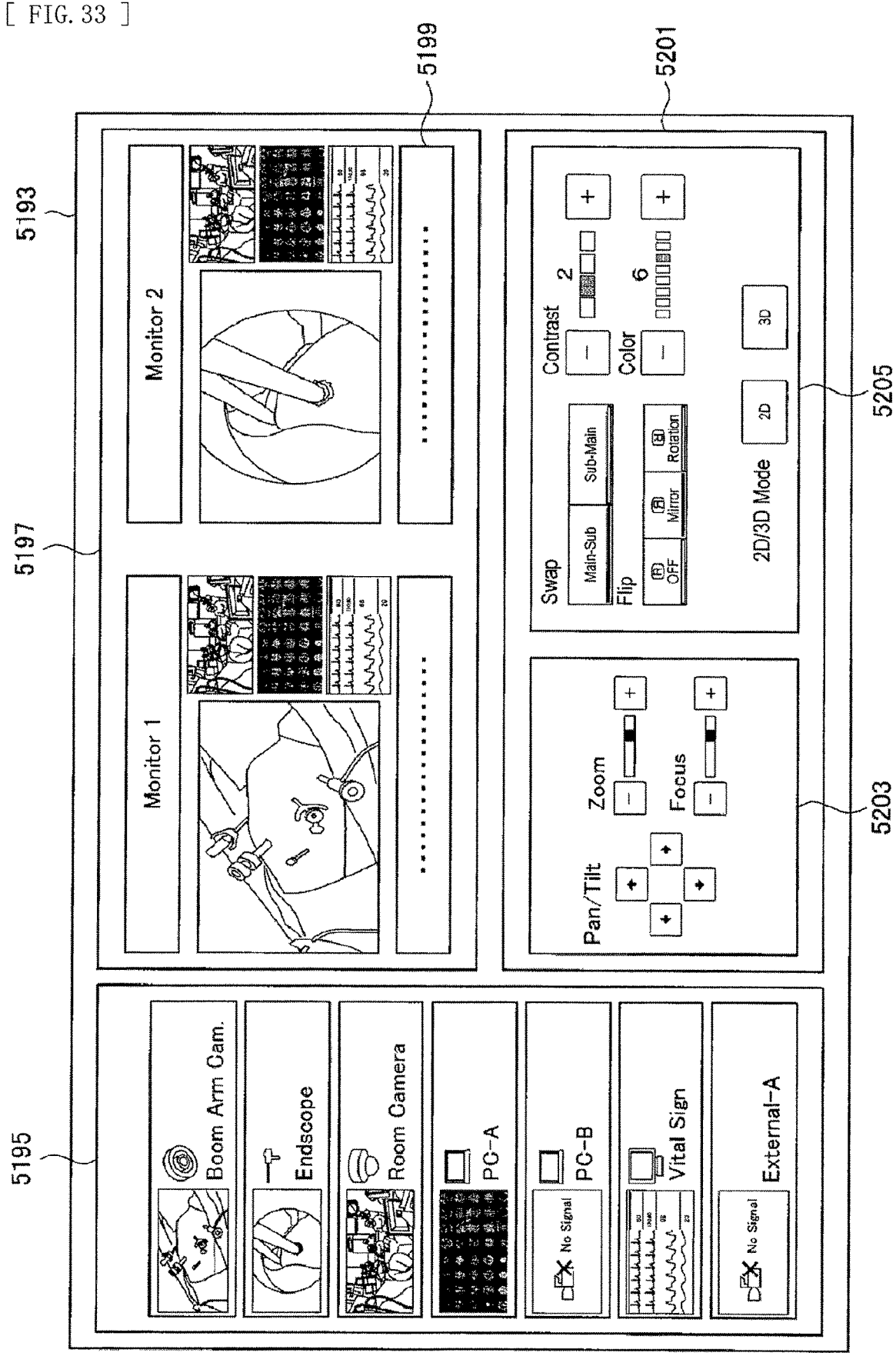
[FIG. 33]

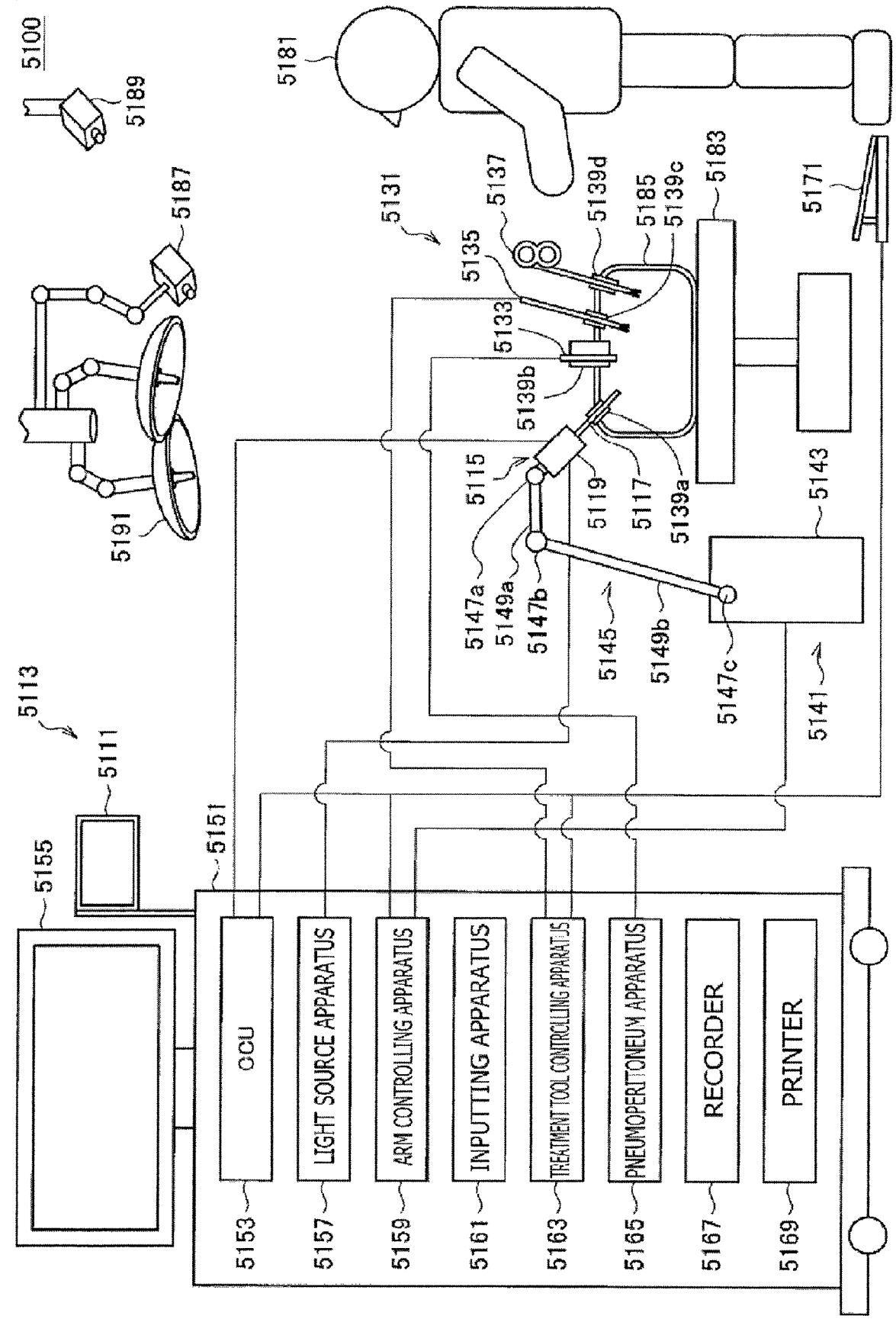
[FIG. 34]

[ FIG. 35 ]
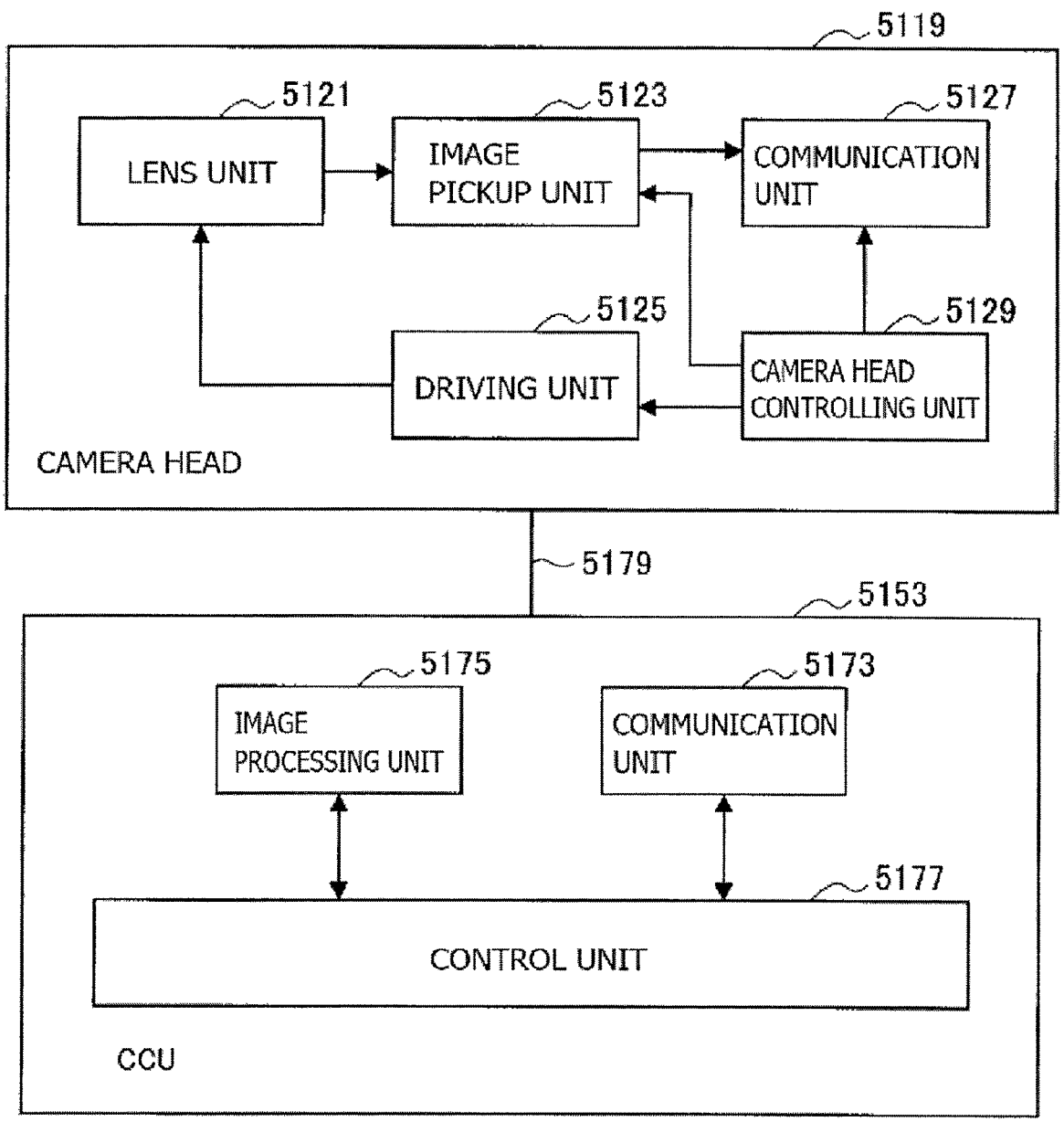

IMAGE SIGNAL LUMINANCE PROCESSING METHOD, DEVICE AND DISPLAY APPARATUS

CROSS-REFERENCE TO RELATED APPLICATIONS

This application is a national phase entry under 35 U.S.C. § 371 of International Application No. PCT/JP2016/071519 filed Jul. 22, 2016, which claims the priority from Japanese Patent Application No. 2015-152635, filed in the Japanese Patent Office on Jul. 31, 2015, the entire contents of which are hereby incorporated by reference.

TECHNICAL FIELD

The present disclosure relates to an image signal processing device and an image signal processing method, and to a display apparatus.

BACKGROUND ART

In recent years, in order to improve image quality of images, the number of imaging pixels in imaging apparatuses and the number of display pixels in display apparatuses have been increased to pursue enhancement of resolution of images. Moreover, in order to further improve the image quality, achievement of a high dynamic range (HDR) of images in which a dynamic range of luminance is increased has been in progress. The HDR is technology to bring images closer to real-world scenes, and has advantages such as ability to realistically express shading.

CITATION LIST

Patent Literature

PTL 1: Japanese Unexamined Patent Application Publication No. 2013-255201

SUMMARY OF THE INVENTION

It may be necessary to subject an HDR image signal to luminance conversion etc. suitable for display apparatuses. At this occasion, development of technology to enhance reproducibility of images is desired to bring quality of the images as close to quality of original images as possible.

It is desirable to provide an image signal processing device, an image signal processing method, and a display apparatus that make it possible to enhance reproducibility of images.

An image signal processing device according to an embodiment of the present disclosure includes a luminance correction section that performs, on a basis of information on a maximum output luminance value in a display section, luminance correction on an image signal to be supplied to the display section, the maximum output luminance value being variable.

An image signal processing method according to an embodiment of the present disclosure includes performing, on a basis of information on a maximum output luminance value in a display section, luminance correction on an image signal to be supplied to the display section, the maximum output luminance value being variable.

A display apparatus according to an embodiment of the present disclosure includes: a display section having a variable maximum output luminance value; and a luminance correction section that performs, on a basis of information on the maximum output luminance value, luminance correction on an image signal to be supplied to the display section.

In the image signal processing device, the image signal processing method, or the display apparatus according to the embodiment of the present disclosure, luminance correction on the image signal to be supplied to the display section is performed on the basis of the information on the maximum output luminance value in the display section having the variable maximum output luminance value.

According to the image signal processing device, the image signal processing method, or the display apparatus according to the embodiment of the present disclosure, luminance correction on the image signal to be supplied to the display section is performed on the basis of the information on the maximum output luminance value in the display section having the variable maximum output luminance value, which makes it possible to enhance reproducibility of an image.

It is to be noted that effects are not necessarily limited to the effects described here, and may be one or more of effects described in the present disclosure.

BRIEF DESCRIPTION OF THE DRAWINGS

FIG. 1 is a block diagram illustrating an outline of a display apparatus according to a first embodiment of the present disclosure.

FIG. 2 is a plan view of an example of a pixel configuration of a display section.

FIG. 3 is a plan view of an example of a pixel configuration of one pixel including three sub-pixels of RGB.

FIG. 4 is a plan view of an example of a pixel configuration of one pixel including four sub-pixels of RGBW.

FIG. 5 is a cross-sectional view of an example of a pixel configuration of one pixel including three self-emitting type sub-pixels of RGB.

FIG. 6 is a cross-sectional view of an example of a pixel configuration of one pixel including four self-emitting type sub-pixels of RGBW.

FIG. 7 is a cross-sectional view of another example of a pixel configuration of a self-light-emitting element.

FIG. 8 is a block diagram illustrating a configuration example in a case where the display section is of a backlight type in the display apparatus illustrated in FIG. 1.

FIG. 9 is a plan view of an example of a partial light emission region of a backlight.

FIG. 10 is an explanatory diagram schematically illustrating an example of a relationship between output luminance and electric power in a case where partial driving of the backlight and luminance boost-up technology are applied.

FIG. 11 is an explanatory diagram illustrating an example of a flow of processes from generation of an image signal to displaying in a simplified manner.

FIG. 12 is an explanatory diagram illustrating an example of luminance correction by a luminance correction section.

FIG. 13 is an explanatory diagram illustrating an example of luminance correction by the luminance correction section.

FIG. 14 is a block diagram illustrating a configuration example of an image signal processing section according to a first modification example.

FIG. 15 is an explanatory diagram schematically illustrating an example of luminance correction by a luminance correction section in the first modification example.

FIG. 16 is a block diagram illustrating a configuration example of an image signal processing section according to a second modification example.

FIG. 17 is an explanatory diagram illustrating an example of a LUT of a luminance correction section in the second modification example.

FIG. 18 is an explanatory diagram illustrating an example of an OOTF characteristic of the luminance correction section in the second modification example.

FIG. 19 is a block diagram illustrating a configuration example of an image signal processing section according to a third modification example.

FIG. 20 is a block diagram illustrating a configuration example of an image signal processing section according to a fourth modification example.

FIG. 21 is a block diagram illustrating a configuration example of an image signal processing section according to a fifth modification example.

FIG. 22 is a block diagram illustrating a configuration example of an image signal processing section according to a sixth modification example.

FIG. 23 is a block diagram illustrating an outline of a display apparatus according to a second embodiment.

FIG. 24 is a block diagram illustrating an outline of a display apparatus according to a third embodiment.

FIG. 25 is a block diagram illustrating a configuration example of a liquid crystal display panel and a backlight driving section in the display apparatus illustrated in FIG. 14.

FIG. 26 is a block diagram illustrating a configuration example of the backlight driving section in the display apparatus illustrated in FIG. 14.

FIG. 27 is a schematic plan view of an example of a direct type backlight.

FIG. 28 is an explanatory diagram illustrating an example of a relationship between an input luminance level and output luminance in a case where a gain of the backlight is changed.

FIG. 29 is an explanatory diagram schematically illustrating an example of a relationship between output luminance and electric power in a case where the partial driving of the backlight is not performed.

FIG. 30 is an explanatory diagram schematically illustrating an example of a relationship between output luminance and electric power in a case where the partial driving of the backlight is performed.

FIG. 31 is an explanatory diagram schematically illustrating an example of a relationship between output luminance and electric power in a case where the partial driving of the backlight and the luminance boost-up technology are applied.

FIG. 32 is a view schematically depicting a general configuration of a surgery room system.

FIG. 33 is a view depicting an example of display of an operation screen image of a centralized operation panel.

FIG. 34 is a view illustrating an example of a state of surgery to which the surgery room system is applied.

FIG. 35 is a block diagram depicting an example of a functional configuration of a camera head and a camera control unit (CCU) depicted in FIG. 34.

MODES FOR CARRYING OUT THE INVENTION

In the following, some embodiments of the present technology are described in detail with reference to the drawings. It is to be noted that description is given in the following order.

0. Comparative Example
1. First Embodiment (a display apparatus in which luminance correction is performed in association with a decoding process (an EOTF process)) (FIGS. 1 to 22)
   1.1 Configuration
   1.2 Operation
   1.3 Effects
   1.4 Modification Examples (FIGS. 14 to 22)
      1.4.1 First Modification Example
      1.4.2 Second Modification Example
      1.4.3 Third Modification Example
      1.4.4 Fourth Modification Example
      1.4.5 Fifth Modification Example
      1.4.6 Sixth Modification Example
2. Second Embodiment (a display apparatus in which luminance correction is performed in association with an encoding process (an OETF process)) (FIG. 23)
3. Third Embodiment (a specific example of a display section) (FIGS. 24 to 31)
4. Fourth Embodiment (Application Example) (FIGS. 32 to 35)
5. Other Embodiments

0. Comparative Example

An example of technology to generate an HDR image is technology described in PTL 1 (Japanese Unexamined Patent Application Publication No. 2013-255201).

In a standard dynamic range (SDR) image, high luminance information is compressed; therefore, the dynamic range is small and it is difficult to say that expression close to real-world scenes is achieved. Whereas maximum luminance of an image by the SDR is about 100 nits, maximum luminance of an image by the HDR is extended to a range from about 1000 nits to about 10000 nits. For example, the maximum luminance is 10000 nits in SMPTE (Society of Motion Picture and Television Engineers) standard ST.2048.

Under the image standard by the HDR, the maximum luminance possibly takes 10000 nits; however, maximum displayable luminance in an existing consumer TV (television) apparatus or monitor is, for example, in a range from about several hundreds of nits to about several thousands of nits. Accordingly, it is difficult to completely reproduce a dynamic range of an inputted HDR image signal. Hence, it may be necessary to subject the HDR image signal to luminance conversion etc. suitable for a display apparatus. At this occasion, development of technology to enhance reproducibility of images is desired to bring quality of the images as close to quality of original images as possible.

1. First Embodiment

1.1 Configuration

FIG. 1 illustrates an outline of a display apparatus according to a first embodiment of the present disclosure.

The display apparatus according to the present embodiment includes an image signal processing section 1, a display section 2, a driving control section 7, and a driving section 8. The image signal processing section 1 includes a decoding section 3, a luminance correction section 4, an encoding section 5, and a maximum luminance information calculation section 6.

For example, an HDR image signal of which gray-scale is compressed by an OETF (Optical-Electro Transfer Function) of the SMPTE standard ST.2048 is inputted to the decoding section 3. The decoding section 3 decodes an image signal with use of, for example, an EOTF (Electro-Optical Transfer Function) that is an inverse function of the OETF.

The encoding section 5 performs, on the decoded image signal, a process (a gamma correction process) using the OETF corresponding to display characteristics of the display section 2.

The driving control section 7 controls the driving section 8 on the basis of the image signal to control driving of the display section 2.

The maximum luminance information calculation section 6 obtains, for example, information such as electric power necessary for driving of the display section 2 from the driving control section 7, and calculates information on a maximum output luminance value Lmax in the display section 2.

The luminance correction section 4 performs luminance correction on the image signal to be supplied to the display section 2 on the basis of the information on the maximum output luminance value Lmax in the display section 2 calculated by the maximum luminance information calculation section 6. The luminance correction section 4 performs luminance correction on the decoded image signal. As will be described later, the luminance correction section 4 performs luminance correction with use of, for example, a transfer function that is a result of multiplication of the EOTF by a correction coefficient M based on the information on the maximum output luminance value Lmax.

The display section 2 includes a plurality of pixels arranged in a matrix pattern in a row direction and a column direction, as illustrated in FIG. 2. FIGS. 3 and 4 each illustrate an example of a planar configuration of one pixel. The one pixel in the display section 2 has, for example, a pixel configuration including three sub-pixels of R (red), G (green), and B (blue), as illustrated in FIG. 3. Moreover, the one pixel may have, for example, a pixel configuration additionally including a sub-pixel of W (white), that is, including four sub-pixels of RGBW, as illustrated in FIG. 4. Note that shapes, kinds, and arrangement of respective sub-pixels are not limited to the configurations illustrated in FIGS. 3 and 4.

The display section 2 may be, for example, a self-emitting type display including a plurality of self-light-emitting elements having a variable drive current, such as OLEDs (Organic Light Emitting Diodes). The OLED is a light-emitting element having a configuration in which a light-emitting layer including an organic light-emitting material is sandwiched between a cathode and an anode.

FIG. 5 illustrates an example of a pixel configuration of one pixel including three self-emitting type sub-pixels of RGB. The three sub-pixels include a red light-emitting layer 10R, a green light-emitting layer 10G, and a blue light-emitting layer 10B.

FIG. 6 illustrates an example of a pixel configuration of one pixel including four self-emitting type sub-pixels of RGBW. The four sub-pixels include the red light-emitting layer 10R, the green light-emitting layer 10G, the blue light-emitting layer 10B, and a white light-emitting layer 10W.

FIG. 7 illustrates another example of the pixel configuration of the self-light-emitting element. In the example in FIG. 7, one pixel includes the white light-emitting layer 10W, a red filter 13R, a green filter 13G, and a blue filter 13B. In this pixel configuration, white light from the white light-emitting layer 10W is converted into RGB through the red filter 13R, the green filter 13G, and the blue filter 13B.

Moreover, the display section 2 may be a backlight type display. In a case where the display section 2 is the backlight type display, the display section 2 may have a configuration including a backlight 22 and a display panel 21 to be irradiated with illumination light from the backlight 22, as illustrated in FIG. 8. The display panel 21 is, for example, a liquid crystal display panel, and includes a plurality of pixels arranged in a matrix pattern in a row direction and a column direction, as illustrated in FIG. 2. The display panel 21 displays an image by modulating the light from the backlight 22 in a pixel unit or a sub-pixel unit.

In a case of the backlight type display, the driving control section 7 may include a panel driving control section 23 and a backlight driving control section 24. Moreover, the driving section 8 may include a panel driving section 25 and a backlight driving section 26. The maximum luminance information calculation section 6 may calculate information on the maximum output luminance value Lmax on the basis of information from the backlight driving control section 24.

The backlight 22 may be divided into a plurality of partial light emission regions 30, as illustrated in FIG. 9. Each of the partial light emission regions 30 may be provided with one or a plurality of light-emitting elements such as LEDs (Light Emitting Diodes). Moreover, the backlight driving control section 24 may perform such lighting control that electric power for each of the partial light emission regions 30 is changed, that is, so-called partial driving.

In the display section 2, the maximum output luminance value Lmax is variable, and a dynamic range of luminance is variable.

FIG. 10 illustrates an example of technology to change the dynamic range of luminance in the display section 2 in the backlight type display. In a case where a white image having 100% as a luminance level of the image signal is uniformly displayed on an entire screen in the display section 2, for example, all of the plurality of partial light emission regions 30 in the backlight 22 are lit up, as illustrated in an upper portion of FIG. 10. It is assumed that output luminance of the display section 2 in this state is 100%; electric power consumption of the backlight 22 is 200 W per half light emission region of the entire backlight 22; and electric power consumption of the entire backlight 22 is 400 W. Moreover, it is assumed that the backlight 22 has electric power limitation of 400 W as a whole.

In contrast, for example, a case where in the display section 2, black display in which the luminance level of the image signal is minimum is performed on a half of the screen and white display in which the luminance level of the image signal is 100% is performed on the other half of the screen is considered, as illustrated in a lower portion of FIG. 10. In this case, the backlight 22 is turned off in a black display portion to cause electric power consumption of the backlight 22 to become 0 W. The backlight in a white display portion may consume 200 W as with the case of the upper portion of FIG. 10; however, in this case, the backlight 22 in the black display portion is turned off, which provides an electric power margin of 200 W. In this case, it is possible to increase the electric power of the backlight 22 in the white display portion up to 200 W+200 W=400 W. Thus, as compared with the case of the upper portion of FIG. 10, it is possible to increase the maximum output luminance value Lmax in the display section 2 to 200%.

Technology to enhance the dynamic range of luminance with use of partial driving of the backlight 22 is called "luminance boost-up". In general, in a case of moving images, light-dark change occurs in images to be displayed on the display section 2 depending on positions in the screen from moment to moment. Accordingly, the maximum output luminance value Lmax in the display section 2 changes from moment to moment depending on light-dark states of the images with use of luminance boost-up technology. It is possible for the maximum luminance information calculation section 6 to obtain, for example, information on electric power consumption for each of the plurality of partial light emission regions 30 from the backlight driving control section 24 and calculate the maximum output luminance value Lmax on the basis of the information on electric power consumption.

Further, even in a case where the display section 2 is a self-emitting type display, the maximum output luminance value Lmax is variable. For example, in order to prevent burn-in, deterioration, etc. of the self-light-emitting element, a current flowing through the self-light-emitting element is limited, which may make it possible to change the maximum output luminance value Lmax in some cases. Furthermore, in a case where electric power of the entire display section 2 is limited in the pixel configuration including four self-emitting type sub-pixels of RGBW illustrated in FIG. 6, the maximum output luminance value Lmax may be changed depending on a state of a color to be displayed in some cases. For example, in the case where the electric power of the entire display section 2 is limited, in comparison between a case where only white display is performed and a case where mixed color display of the R color, the G color, and the B color is performed, it may be possible to increase the maximum output luminance value Lmax in the case where only white display is performed.

1.2 Operation

FIG. 11 illustrates an example of a flow of processes from generation of the HDR image signal to displaying in a simplified manner. For example, image data having a linear relationship between input and output obtained by an imaging apparatus 50 is quantized (encoded) by, for example, the OETF of the SMPTE standard ST.2048 to perform grayscale compression on luminance, thereby generating the HDR image signal.

On the display apparatus side illustrated in FIG. 1, the decoding section 3 decodes (inversely quantizes) the image signal with use of the EOTF that is an inverse function of the OETF. Moreover, the decoding section 3 performs normalization by an arbitrary reference luminance value Lref on an as-needed basis. The luminance correction section 4 performs luminance correction on the image signal with use of a transfer function that is a result of multiplication of the EOTF used in the decoding section 3 by the correction coefficient M on the basis of the information on the maximum output luminance value Lmax of the display section 2. This corresponds to correction (change) of the EOTF. As described above, it may be possible to dynamically change the maximum output luminance value Lmax of the display section 2. This may make it possible to dynamically change a corrected value of the EOTF by the luminance correction section 4 depending on change in the maximum output luminance value Lmax.

A rightmost characteristic graph illustrated in FIG. 11 indicates an example of a relationship between an input luminance level and an output luminance level in the display section 2. Description herein is given of an example in which the display section 2 is the backlight type display illustrated in FIG. 8. As described with use of FIG. 10 mentioned above, in the backlight type display, using the partial driving and the luminance boost-up technology in the display section 2 makes it possible to enhance the maximum output luminance value Lmax.

In the rightmost characteristic graph illustrated in FIG. 11, an ideal input-output characteristic 51 indicates an example in which a characteristic of an HDR image signal originally intended on an image signal generation side is reproduced. In contrast, an input-output characteristic 55 indicates an example of a characteristic in a case where an image is displayed without performing the partial driving, the luminance boost-up, and luminance correction by the luminance correction section 4. In the input-output characteristic 55, output luminance is compressed at some midpoint, and an image signal on a high luminance side is not reproduced.

Input-output characteristics 53 and 54 each indicate an example of a characteristic in a case where the partial driving and the luminance boost-up are performed, but the luminance correction by the luminance correction section 4 is not performed. Performing the partial driving and the luminance boost-up makes it possible to reproduce the image signal on the high luminance side, as compared with the input-output characteristic 55; however, the luminance correction by the luminance correction section 4 is not performed, which causes the characteristic to depart from the ideal input-output characteristic 51 in an entire luminance region. In contrast, the input-output characteristic 52 indicates an example of a characteristic in a case where the partial driving, the luminance boost-up, and the luminance correction by the luminance correction section 4 are performed. The luminance correction by the luminance correction section 4 is performed, thereby obtaining a characteristic closer to the ideal input-output characteristic 51, as compared with the input-output characteristics 53 and 54.

FIG. 12 illustrates a specific example of the luminance correction by the luminance correction section 4.

The luminance correction section 4 performs, for example, an operation of multiplying the EOTF used in the decoding section 3 by the correction coefficient M. As the correction coefficient M, it is possible to use a value corresponding to a ratio of the arbitrary reference luminance value Lref used for normalization in decoding by the decoding section 3 and the maximum output luminance value Lmax of the display section 2, e.g. a value of M=Lref/Lmax. Thus, the EOTF is corrected to a result of multiplication of the EOTF by M times. Specifically, in a case where the decoding section 3 performs decoding and a normalization process on the EOTF, for example, with use of the reference luminance value Lref=10000 nits, if the maximum output luminance value Lmax is 750 nits, the correction coefficient M is 1.333. Moreover, for example, if the maximum output luminance value Lmax is 1500 nits, the correction coefficient M is 0.6667. It is to be noted that in a case where the normalization on the EOTF is not performed upon the decoding and the corrected EOTF is directly calculated, it is only necessary to apply division of Lmax on the assumption that the reference luminance value Lref is equal to 1.

FIG. 13 illustrates an example of more specific values in the luminance correction. FIG. 13 illustrates an example ((1)) of the value of the EOTF having been subjected to the luminance correction in the case where normalization of the EOTF is not performed upon the decoding and an example ((2)) of the value of the EOTF having been subjected to the luminance correction in a case where the EOTF is normalized upon decoding. It is to be noted that as with the example in FIG. 12, an example in which the arbitrary reference value Lref used for the normalization is equal to 1000 nits; the maximum output luminance value Lmax is equal to 750 nits; and M is equal to 1.333 is illustrated. In the case where the EOTF is normalized upon the decoding, an EOTF' that is the EOTF normalized by the arbitrary reference luminance value Lref is calculated, and the EOTF' is multiplied by M=(Lref/Lmax) to obtain the EOTF having been subjected to the luminance correction.

That is, (2)=EOTF'*M=(HDR EOTF/Lref)*(Lref/Lmax)

Moreover, in a case where the normalization is not performed, it is only necessary to perform only division of Lmax on the assumption that Lref is equal to 1.

That is, (1)=HDR EOTF/Lmax

It is to be noted that individual variation may occur in characteristics of the self-light-emitting elements in the self-emitting type display and characteristics of the light-emitting elements in the backlight type display. Accordingly, individual variation may occur in the maximum output luminance value Lmax in the display section 2. In other words, even if a same image signal is inputted, individual variation may occur in the maximum output luminance value Lmax in each display apparatus. Upon calculation of the maximum output luminance value Lmax by the maximum luminance information calculation section 6, it is desirable to perform calculation in consideration of such individual variation.

1.3 Effects

As described above, according to the present embodiment, the luminance correction is performed on the image signal on the basis of information on the maximum output luminance value Lmax in the display section 2 in which the maximum output luminance value Lmax is variable. This makes it possible to enhance reproducibility of the HDR image signal.

It is to be noted that the effects described in the present specification are illustrative and non-limiting, and other effects may be achieved. The same applies to effects of the following other embodiments.

1.4 Modification Examples

In the above description, in the image signal processing section 1, an EOTF process by the decoding section 3 is performed, and thereafter, the luminance correction section 4 performs the luminance correction; however, the luminance correction on the basis of information on the maximum output luminance value Lmax may be performed upon a decoding process by the decoding section 3. In other words, in the image signal processing section 1, the EOTF process may not be performed in two stages, but the EOTF process may be performed directly using the EOTF calculated on the basis of the maximum output luminance value Lmax of the display section 2 upon the decoding process by the decoding section 3, as illustrated in FIG. 12. In the image signal processing section 1, the decoding section 3 and the luminance correction section 4 may be combined into one process block as a circuit block.

Moreover, the image signal processing section 1 of the display apparatus according to the present embodiment may have any of configurations according to the following modification examples.

1.4.1 First Modification Example

FIG. 14 illustrates a configuration example of an image signal processing section 101 according to a first modification example.

In the foregoing embodiment, description has been given of an example in which signal processing by a PQ (Perceptual Quantization) system is performed in the image signal processing section 1; however, the technology by the present disclosure is applicable also to a case where signal processing by a HLG (Hybrid Log Gamma) system is performed.

In the case of the HLG system, an OOTF (Opto-Optical Transfer Function) process is performed on a signal value having been subjected to the EOTF process by the decoding section 3. In this case, output luminance of the display section 2 is represented by the following expression, for example.

$F_D = \text{OOTF}[E] = \alpha\{Y_S\hat{}(\gamma-1)\}E + \beta$ $R_D = \alpha\{Y_S\hat{}(\gamma-1)\}R_S + \beta$ $G_D = \alpha\{Y_S\hat{}(\gamma-1)\}G_S + \beta$ $B_D = \alpha\{Y_S\hat{}(\gamma-1)\}B_S + \beta$ $Y_S = 0.2627 R_S + 0.6780 G_S + 0.0593 B_S$ $\gamma = 1.2 + 0.42 \log_{10}(Lw/1000)$ Herein, $F_D$ corresponds to output luminance of the display section 2. OOTF[E] indicates that the OOTF process is performed on the signal value having been subjected to the OETF process by the decoding section 3. $R_S$, $G_S$, and $B_S$ correspond to signal values of R, G, and B having been subjected to the EOTF process by the decoding section 3, and $\alpha$ and $\tau 3$ are coefficients defined by the EOTF.

It is to be noted that "^" indicates exponentiating, which similarly applies to the following description.

Moreover, Lw corresponds to the output luminance value Lmax in the display section 2. From the foregoing expression, a value of γ (gamma) changes with change in the maximum output luminance value Lmax. Upon the OOTF process, a process of multiplying the signal value having been subjected to the EOTF process by $Y_S\hat{}(\gamma-1)$ is performed. In the luminance correction section 4, the maximum output luminance value Lmax is reflected on the value of γ upon the OOTF process, as illustrated in FIG. 14, which makes it possible to perform luminance correction corresponding to the maximum output luminance value Lmax.

FIG. 15 schematically illustrates an example of luminance correction by the luminance correction section 4 in the first modification example. FIG. 15 illustrates a characteristic curve, where a horizontal axis indicates a signal value, and a vertical axis indicates a luminance value on a signal. As illustrated in FIG. 15, luminance correction corresponding to the maximum output luminance value Lmax is performed upon the OOTF process to change the characteristic curve. For example, in a case where the maximum output luminance value Lmax becomes relatively lower, correction is so performed as to cause a depth of the characteristic curve to become relatively shallower. Moreover, for example, in a case where the maximum output luminance value Lmax becomes relatively higher, correction is so performed as to cause the depth of the characteristic curve to become relatively deeper.

Other configurations and operations, etc. may be substantially similar to those in the image signal processing section 1 illustrated in FIG. 1.

1.4.2 Second Modification Example

FIG. 16 illustrates a configuration example of an image signal processing section 102 according to a second modification example.

In the image signal processing section 102, a color space conversion circuit 111 (first color space conversion circuit) that converts color space from RGB color space (first color space) to HSV color space (second color space) may be provided between the decoding section 3 and the luminance correction section 4, as illustrated in FIG. 16. Moreover, in the image signal processing section 102, a color space conversion circuit 112 (second color space conversion circuit) that converts color space from the HSV color space to the RGB color space may be provided between the luminance correction section 4 and the encoding section 5. It is to be noted that the HSV color space is color space including three components, that is, hue (Hue), saturation (Saturation), and value (Value).

The luminance correction section 4 may perform luminance correction on a signal of value V outputted from the color space conversion circuit 111. A signal of hue H and a signal of saturation S outputted from the color space conversion circuit 111, and the signal of value V having been subjected to the luminance correction by the luminance correction section 4 may be inputted to the color space conversion circuit 112.

It is possible to perform the luminance correction by the luminance correction with a LUT (look-up table) corresponding to the OOTF. In such a case, adding a simple LUT to an existing HSV processing circuit makes it possible to implement the image signal processing section 102 in FIG. 16.

Description is given of an example of a technique of calculating a LUT of the luminance correction section 4 with reference to FIG. 17. FIG. 17 illustrates an example of the LUT of the luminance correction section 4 in the second modification example.

The LUT may be calculated by the following flow, for example.

(1) It is assumed that an HDR image signal to be inputted to the image signal processing section 102 is E'. As the EOTF, for example, a luminance signal (FD1000) in a case where the maximum output luminance value is 1000 nits is determined from the image signal E'. The luminance signal (FD1000) may be, for example, a value calculated according to predetermined image standards of the HDR.

(2) Next, a luminance signal (DF1000') that is the normalized luminance signal (FD1000) is determined. For example, in a case where an assumed maximum output luminance value is 1000 nits, each signal level is normalized to $1/1000$.

(3) Next, a value (OOTFγ) of γ of the OOTF based on the actual maximum output luminance value Lmax (=Lw) is determined. For example, the value of OOTFγ in a case where the maximum output luminance value Lmax is 2000 nits is determined.

(4) Next, a γ process by the OOTFγ is performed on the normalized luminance signal (FD1000') to determine a normalized luminance signal (Test2000').

(5) The luminance signal (Test2000') normalized as described above makes it possible to perform a HLG process at a maximum of 2000 nits. A luminance characteristic outputted from the display section 2 has a value such as luminance (Test2000) illustrated in FIG. 17.

In a case where the originally assumed maximum output luminance value is 1000 nits, and the actual maximum output luminance value Lmax (=Lw) is 2000 nits as described above, OOTFγ has the following value, for example.

$$OOTF\gamma = (1.2 + 0.42*\text{LOG}(Lw/1000))/(1.2 + 0.42*\text{LOG}(1000/1000))$$
$$= 1.10536$$

FIG. 18 illustrates an example of an OOTF characteristic of the luminance correction section 4 in the second modification example.

A solid curve in FIG. 18 indicates the OOTF characteristic. The OOTF characteristic is determined, for example, as follows with use of the foregoing various values.

$$OOTF \text{ characteristic} = OOTF \text{ input} \wedge OOTF\gamma$$
$$= FD1000' \wedge OOTF\gamma$$
$$= FD1000' \wedge 1.10536$$

Other configurations, operations, etc. may be substantially similar to those in the image signal processing section 1 in FIG. 1.

1.4.3 Third Modification Example

FIG. 19 illustrates a configuration example of an image signal processing section 103 according to a third modification example.

The luminance correction section 4 may include a color gamut conversion section 110, as illustrated in FIG. 19. The color gamut conversion section 110 performs color gamut conversion on signals of RGB with a color gamut conversion matrix. The color gamut conversion matrix is a coefficient for color gamut conversion on the signals of RGB. The color gamut conversion matrix may be multiplied by a correction coefficient based on the maximum output luminance value Lmax. The correction coefficient may be, for example, a value (M=Lref/Lmax) corresponding to a ratio of the reference luminance value Lref and the maximum output luminance value Lmax as illustrated in FIG. 12 mentioned above. The corrected color gamut conversion matrix may be multiplied by the signals of RGB outputted from the decoding section 3 to perform color gamut conversion. In a case where the color gamut conversion matrix is, for example, a 3×3 matrix, all of 3×3 matrix values are multiplied by a same correction coefficient, which makes it possible to perform luminance correction that is substantially same as that in a case where multiplication by the correction coefficient is performed after the EOTF process.

It is to be noted that an example in which the color gamut conversion is performed is described here; however, a color space conversion matrix upon conversion of color space from RGB to HSV or YUV may be multiplied by the correction coefficient based on the maximum output luminance value Lmax.

Other configuration, operations, etc. may be substantially similar to those in the image signal processing section 1 illustrated in FIG. 1.

1.4.4 Fourth Modification Example

FIG. 20 illustrates a configuration example of an image signal processing section 104 according to a fourth modification example.

In the image signal processing section 104, the color space conversion circuit 111 that converts color space from the RGB color space to the HSV color space may be provided between the decoding section 3 and the luminance correction section 4, as illustrated in FIG. 20. Moreover, in the image signal processing section 104, the color space conversion circuit 112 that converts color space from the HSV color space to the RGB color space may be provided between the luminance correction section 4 and the encoding section 5.

The luminance correction section 4 may perform luminance correction on the signal of value V outputted from the color space conversion circuit 111. The luminance correction section 4 may multiply the signal of value V outputted from the color space conversion circuit 111 by the correction coefficient based on the maximum output luminance value Lmax. The correction coefficient may be, for example, a value (M=Lref/Lmax) corresponding to a ratio of the reference luminance value Lref and the maximum output luminance value Lmax, as illustrated in FIG. 12 mentioned above.

The signal of hue H and the signal of saturation S outputted from the color space conversion circuit 111, and the signal of value V having been subjected to the luminance correction by the luminance correction section 4 may be inputted to the color space conversion circuit 112.

Other configurations, operations, etc. may be substantially similar to those in the image signal processing section 1 illustrated in FIG. 1.

1.4.5 Fifth Modification Example

FIG. 21 illustrates a configuration example of an image signal processing section 105 according to a fifth modification example.

In the image signal processing section 105, a color space conversion circuit 121 (first color space conversion circuit) that converts color space from RGB color space (first color space) to YUV color space (second color space) may be provided between the decoding section 3 and the luminance correction section 4, as illustrated in FIG. 21. Moreover, in the image signal processing section 105, a color space conversion circuit 122 (second color space conversion circuit) that converts color space from the YUV color space to the RGB color space may be provided between the luminance correction section 4 and the encoding section 5. It is to be noted that the YUV color space is color space including a luminance signal Y and two color-difference signals U and V.

The luminance correction section 4 may perform luminance correction on a YUV signal outputted from the color space conversion circuit 121. The luminance correction section 4 may multiply the YUV signal outputted from the color space conversion circuit 121 by the correction coefficient based on the maximum output luminance value Lmax. The correction coefficient may be, for example, a value (M=Lref/Lmax) corresponding to the ratio of the reference luminance value Lref and the maximum output luminance value Lmax as illustrated in FIG. 12 mentioned above.

The YUV signal having been subjected to the luminance correction by the luminance correction section 4 may be inputted to the color space conversion circuit 122.

Other configurations, operations, etc. may be substantially similar to those in the image signal processing section 1 illustrated in FIG. 1.

1.4.6 Sixth Modification Example

FIG. 22 illustrates a configuration example of an image signal processing section 106 according to a sixth modification example.

In the image signal processing section 106, the color space conversion circuit 121 that converts color space from the RGB color space to the YUV color space may be provided between the decoding section 3 and the luminance correction section 4, as illustrated in FIG. 22. Moreover, in the image signal processing section 105, the color space conversion circuit 122 that converts color space from the YUV color space to the RGB color space may be provided between the luminance correction section 4 and the encoding section 5.

The luminance correction section 4 may perform luminance correction on the luminance signal Y outputted from the color space conversion circuit 121. It is possible to perform the luminance correction by the luminance correction section 4 with a LUT corresponding to the OOTF in a manner substantially similar to that in the image signal processing section 102 in FIG. 16.

Moreover, in the image signal processing section 106, a color correction section 130 may be provided between the color space conversion circuit 121 and the color space conversion circuit 122. The color correction section 130 corrects the color-difference signals U and V on the basis of a ratio of a value of the luminance signal Y before being subjected to the luminance correction by the luminance correction section 4 and a value of a luminance signal Y' having been subjected to the luminance correction. The color correction section 130 may include a ratio calculation section 131 and a multiplication circuit 132.

The luminance signal Y outputted from the color space conversion circuit 121 and the luminance signal Y' having been subjected to the luminance correction by the luminance correction section 4 may be inputted to the ratio calculation section 131. The ratio calculation section 131 calculates a ratio (Y'/Y) of the luminance signal Y and the luminance signal Y'.

The multiplication circuit 132 multiplies the color-difference signals U and V outputted from the color space conversion circuit 121 by the ratio (Y'/Y).

Color-difference signals U' and V' having been subjected to multiplication by the multiplication circuit 132 and the luminance signal Y' having been subjected to the luminance correction by the luminance correction section 4 are inputted to the color space conversion circuit 122.

Herein, in a case where the color-difference signals U and V outputted from the color space conversion circuit 121 are directly inputted to the color space conversion circuit 122 without providing the ratio calculation section 131 and the multiplication circuit 132, a LUT process is performed on the luminance signal Y, which causes an RGB ratio after the color space conversion process to be different from an RGB ratio before the color space conversion process. This may change color tone. Hence, in the present modification example, a UV signal is corrected with use of a technique called Y/C ratio correction by the ratio calculation section 131 and the multiplication circuit 132. Multiplying the color-difference signals U and V by a ratio (Y'/Y) of the luminance signals Y before and after the LUT process makes it possible to maintain the RGB ratio before and after the color space conversion process.

Assuming that YUV after color space conversion from RGB to YUV are Yorg, Uorg, and Vorg. If Yorg becomes Ynew after the LUT process, U and V are multiplied by a similar ratio to obtain Unew=Uorg×(Ynew/Yorg) and Vnew=Vorg×(Ynew/Yorg). As a result, all of YUV are multiplied by (Ynew/Yorg), which makes it possible to maintain the RGB ratio. This is the same as multiplication of a color space conversion matrix from YUV to RGB by this ratio as a scalar value; therefore, the RGB ratio is maintained.

Other configurations, operations, etc. may be substantially similar to those in the image signal processing section 1 illustrated in FIG. 1.

2. Second Embodiment

Next, description is given of a second embodiment of the present disclosure. Hereinafter, description of portions having configurations and workings similar to those in the foregoing first embodiment is omitted as appropriate.

FIG. 23 illustrates an outline of a display apparatus according to the second embodiment of the present disclosure.

The display apparatus according to the present embodiment includes an image signal processing section 1A having a configuration different in the position of the luminance correction section 4 from the configuration in the foregoing first embodiment. In the foregoing first embodiment, luminance correction is performed between a process by the decoding section 3 and a process by the encoding section 5; however, luminance correction by the luminance correction section 4 may be performed after the process by the encoding section 5, as illustrated in FIG. 23.

In the encoding section 5, for example, gamma correction is performed. In the gamma correction, an operation to the power of $(1/\gamma)$ as the OETF, for example, an operation of $X^{\wedge}(1/\gamma)$ on an inputted signal X is performed, where $\gamma$ is, for example, a value such as 2.2 or 2.4. In the luminance correction section 4, for example, an operation using the OETF multiplied by the correction coefficient M similar to that in the foregoing first embodiment, for example, an operation of $M^{\wedge}(1/\gamma)$ is performed on a signal having been subjected to the OETF process by the encoding section 5. Thus, an effect similar to an effect achieved by correction to a result of multiplication by M times before application of the OETF.

It is to be noted that in the above description, after the EOTF process by the encoding section is performed, the luminance correction section 4 performs luminance correction. Alternatively, upon the OETF process by the encoding section 5, luminance correction based on information on the maximum output luminance Lmax may be performed. In other words, the EOTF process may not be performed in two stages, but the EOTF process may be performed directly using the EOTF calculated on the basis of the maximum output luminance value Lmax of the display section 2. The encoding section 5 and the luminance correction section 4 may be combined into one process block as a circuit block.

Other configurations, operations, etc. may be substantially similar to those in the display apparatus according to the foregoing first embodiment.

3. Third Embodiment

Next, description is given of a third embodiment of the present disclosure. Hereinafter, description of portions having configurations and workings similar to those in the foregoing first embodiment or the foregoing second embodiment is omitted as appropriate.

FIG. 24 illustrates an outline of a display apparatus according to the third embodiment of the present disclosure.

In the present embodiment, a configuration example of a liquid crystal display is illustrated as a specific example of the display section 2 illustrated in FIGS. 1 and 8 mentioned above.

The display apparatus according to the present embodiment includes an input terminal 201, a video decoder 202 that corresponds to the decoding section 3, the luminance correction section 4, the maximum luminance information calculation section 6, and a video encoder 204 that corresponds to the encoding section 5 and the panel driving control section 23. Moreover, the display apparatus includes a data driver 205 and a gate driver 206 that correspond to the panel driving section 25, a liquid crystal display panel 207 that corresponds to the display panel 21, and a backlight 208 that corresponds to the backlight 22. Further, the display apparatus includes a backlight driving control section 209 that corresponds to the backlight driving control section 24, and a power source 210.

The luminance correction section 4 and the maximum luminance information calculation section 6 have functions substantially similar to those in the foregoing first embodiment. It is to be noted that the luminance correction section 4 may be provided not between the video decoder 202 and the video encoder 204 but in a stage following the video encoder 204 in a manner substantially similar to that in the display apparatus illustrated in FIG. 23 mentioned above.

The HDR image signal is inputted to the video decoder 202 through the input terminal 201. The video decoder 202 performs processes such as decoding of an image signal using the EOTF. The video decoder 202 performs, for example, signal processing such as a chroma process on the image signal to output an RGB image signal having resolution suitable for driving of the liquid crystal display panel 207 to the luminance correction section 4 together with a horizontal synchronization signal H and a vertical synchronization signal V.

The luminance correction section 4 performs luminance correction substantially similar to that in the foregoing first embodiment on the image signal outputted from the video decoder 202, and thereafter, the image signal having been subjected to the luminance correction is supplied to the video encoder 24 together with the horizontal synchronization signal H and the vertical synchronization signal V.

The video encoder 204 generates a control signal that causes the data driver 205 and the gate driver 206 to operate in synchronization with the horizontal synchronization signal H and the vertical synchronization signal V. Moreover, the video encoder 24 generates a light amount control signal for control of the backlight 208, and supplies the light amount control signal to the backlight driving control section 209.

The data driver 205 is a driving circuit that outputs a drive voltage based on the image signal, and generates and outputs a signal that is to be applied to a data line of the liquid crystal display panel 207 on the basis of a timing signal and the image signal transmitted from the video encoder 204. Moreover, the gate driver 206 is a driving circuit that generates a signal for sequential driving of gate lines (scanning lines) of the liquid crystal display panel 207, and outputs a drive voltage to a gate line coupled to each pixel in the liquid crystal display panel 207 in accordance with the timing signal transmitted from the video encoder 204.

The liquid crystal display panel 207 includes, for example, a plurality of pixels arranged in, for example, a grid pattern. The liquid crystal display panel 207 has a configuration in which liquid crystal molecules having a predetermined orientation state are sealed between transparent plates such as glass, and displays an image on the basis of application of a signal from outside. The application of the signal to the liquid crystal display panel 207 is executed by the data driver 205 and the gate driver 206.

The backlight 208 is a surface illumination device mounted on a back surface side of the liquid crystal display panel 207, and applies light from the back surface side of the liquid crystal display panel 207, which makes it possible to visually recognize an image to be displayed on the liquid crystal display panel 207. The backlight 208 has, for example, a direct type configuration in which a light source is disposed directly below the back surface side of the liquid crystal display panel 207. As the light source of the backlight 208, it is possible to use an LED emitting the R color, the G color, or the B color, or an LED emitting white light. Moreover, as the light source of the backlight 208, a laser light source may be used.

FIG. 27 schematically illustrates a configuration example of a direct type backlight as the backlight 208. In the example illustrated in FIG. 27, the backlight 208 is configured by a plurality of light source units 42 partitioned by a light-shielding division wall 2101. Each of the light source units 42 includes a unit light emission module configured by a predetermined number of combinations of light sources of one or more kinds. For example, the unit light emission module is configured by a light emitting diode unit. The light-shielding division wall 2101 is vertically installed perpendicular to a mounting surface of each single-color light source. Thus, the light-shielding division wall 2101 reduces leakage of illumination light between the respective unit light emission modules to achieve favorable gray-scale control. It is to be noted that in the example illustrated in FIG. 27, a planar shape of each of the light source units 42 partitioned by the light-shielding division wall 2101 is a rectangular shape, but the planar shape of the light source unit 42 may be any other shape. For example, the light source unit 42 may have, for example, a triangular shape or a honeycomb shape.

It is to be noted that the backlight 208 may have an edge light type configuration in which a light source is disposed around a light guide plate.

The backlight driving control section 209 controls, for example, brightness individually for each of light emitting diode units of the backlight 208 in accordance with the light amount control signal supplied from the video encoder 204. It is possible for the backlight driving control section 209 to control, for example, a light amount of each of the light emitting diode units in accordance with an amount of electric power supply from the power source 210. Moreover, the backlight driving control section 209 performs such partial driving that a lighting state of the backlight 208 for each of the light source units 42 is controlled.

FIG. 25 illustrates a specific example of the liquid crystal display panel 207 and the driving section of the backlight 208. Moreover, FIG. 26 illustrates a specific example of a portion of the driving section of the backlight 208.

The liquid crystal display panel 207 includes, for example, a display region 11 in which a total number of $M_0 \times N_0$ of pixels are arranged in a matrix pattern, where a number $M_0$ of pixels are arranged along a first direction and a number $N_0$ of pixels are arranged along a second direction, as illustrated in FIG. 25. Specifically, in a case where the number $M_0 \times N_0$ of pixels arranged in a matrix pattern satisfies HD-TV standards as image display resolution, and is represented by $(M_0, N_0)$, the number $M_0 \times N_0$ of pixels is, for example, (1920, 1080) or (3840, 2160). In a case where partial driving is performed in the liquid crystal display panel 207, for example, the display region 11 is divided into a number $P \times Q$ of virtual display region units 12. Each of the display region units 12 is configured by a plurality ($M \times N$) of pixels. Moreover, the backlight 208 is divided into the number of $P \times Q$ of light source units 42 corresponding to the number $P \times Q$ of virtual display region units 12. It is to be noted that the division numbers of the display region 11 and the backlight 208 are not limited to the illustrated numbers.

Each of the pixels in the liquid crystal display panel 207 is configured by one group of a plurality of sub-pixels that emit respective different colors. More specifically, each of the pixels is configured by, for example, three sub-pixels, i.e., a red light emitting pixel [R], a green light emitting pixel [G], and a blue light emitting pixel [B].

Each of the light source units 42 illuminates a corresponding one of the display region units 12 from a back side. Moreover, the light emitting diode units provided in the light source units 42 are separately controlled.

The display apparatus includes a liquid crystal display panel driving circuit 90 as a driving section of the liquid crystal display panel 207, as illustrated in FIG. 25. The liquid crystal display panel driving circuit 90 includes a timing controller 91.

The backlight driving control section 209 includes a light source unit driving circuit 80. The backlight driving control section 209 performs, for example, lighting control on a light emitting diode 41 configuring the backlight 208 on the basis of a pulse width modulation control system. Moreover, the backlight driving control section 209 may include an operational circuit 71 and a storage device 72.

The light source unit driving circuit 80 includes an operational circuit 81, a storage device 82, an LED driving circuit 83, a switching element 85 configured by a FET (Field Effect Transistor), and a light emitting diode driving power source 86 as a constant current source, as illustrated in FIG. 26.

A current detection resistor r is inserted downstream of each light emitting diode 41 and in series with each light emitting diode 41. Accordingly, a current flowing through the resistor r is converted into a voltage, and operation of the light emitting diode driving power source 86 is controlled under control by the LED driving circuit 83 so as to cause a voltage in the resistor r to drop to a predetermined value.

In the liquid crystal display panel 207, gray-scale of luminance of each of the sub-pixels [R, G, B] is controllable in a range of, for example, $2^8$ levels from 0 to 255. In this case, each of values $x_R$, $x_G$, and $x_B$ of input signals [R, G, B] inputted to the liquid crystal display panel driving circuit 90 has a value in a range of $2^8$ levels. Moreover, a value of a pulse width modulation signal S for control of light emission time of the light emitting diode 41 configuring each of the light source units 42 also has a value in a range of $2^8$ levels from 0 to 255. However, the values are not limited thereto. For example, 10-bit control is adopted to allow for gray-scale control in $2^{10}$ levels from 0 to 1023. In this case, expression with an 8-bit numerical value may be multiplied by four, for example.

A control signal for control of light transmittance $L_t$ is supplied from the liquid crystal display panel driving circuit 90 to each of the pixels in the liquid crystal display panel 207. Specifically, control signals [R, G, B] for control of each light transmittance $L_t$ is supplied from the liquid crystal display panel driving circuit 90 to the sub-pixels [R, G, B]. In other words, in the liquid crystal display panel driving circuit 90, the control signals [R, G, B] are generated from input signals [R, G, B], and the control signals [R, G, B] are supplied to the sub-pixels [R, G, B]. It is to be noted that light source luminance of the light source unit 42 is changed for each image display frame. The control signals [R, G, B] basically have values that is a result by performing, on the basis of change in the light source luminance, correction on (compensation for) values that are results of γ-correction on the input signals [R, G, B].

The control signals [R, G, B] are transmitted from the timing controller 91 to the data driver 205 and the gate driver 206 of the liquid crystal display panel 207. A switching element configuring each of the sub-pixels of the liquid crystal display panel 207 is driven on the basis of the control signals [R, G, B]. As a result, a desired voltage is applied to a transparent electrode configuring a liquid crystal cell of the liquid crystal display panel 207 to control the light transmittance $L_t$ of each of the sub-pixels. Herein, the larger the values of the control signals [R, G, B] are, the higher the light transmittance $L_t$ of the sub-pixels [R, G, B] becomes, and the higher the values of luminance of the sub-pixels [R, G, B] become.

The display luminance of the liquid crystal display panel 207 and the light source luminance of the backlight 208 are controlled for each image display frame in image displaying, for each of the display region units 12, and for each of the light source units 42. Moreover, operation of the liquid crystal display panel 207 and operation of the backlight 208 in one image display frame are synchronized.

It is to be noted that the configuration example of the liquid crystal display is described above as a specific example of the display section 2; however, the display section 2 is applicable to any devices other than the liquid crystal display. For example, a MEMS display in which a MEMS (Micro Electro-Mechanical System) shutter is driven on a TFT substrate is applicable to the display section 2.

Moreover, the configuration of the liquid crystal display in the present embodiment is not limited to a specific pixel arrangement configuration. Examples thereof may include a four-color pixel configuration of RGBW including sub-pixels of three primary colors RGB and a white (W) sub-pixels and a four-color pixel configuration of RGBY including sub-pixels of three primary colors RGB and a yellow (Y) sub-pixels.

[Partial Driving and Luminance Boost-Up Technology]

Controlling a gain amount K of the backlight 208 by the backlight driving control section 209 makes it possible to change output luminance of the backlight 208. Increasing the gain amount K makes it possible to increase output luminance of the backlight 208. However, the gain amount K is controlled within a limit based on hardware.

Applying the partial driving and the luminance boost-up technology to the backlight 208, for example, distributing electric power saved in a dark region to a high luminance region to intensively emit light makes it possible to cause output luminance to become higher than normal. The backlight driving control section 209 may analyze the image signal, and may determine the gain amount K of the backlight 208 on the basis of maximum luminance in a case where the partial driving and the luminance boost-up technology are applied.

For example, increasing the gain amount K of the backlight 208 makes it possible to improve output luminance of the backlight 208 in all gray-scale levels, as illustrated in FIG. 28. In FIG. 28, a characteristic in which the gain amount K is becomes larger with respect to an input-output characteristic 401 is an input-output characteristic 402. It is to be noted that for the sake of convenience, each of the input-output characteristics 401 and 402 are linearly drawn in FIG. 28, but may be a curve such as an exponential function.

As described above, a combination of the partial driving and the luminance boost-up technology makes it possible to improve the dynamic range of luminance. Description is given of an operation example of the partial driving and the luminance boost-up technology in the liquid crystal display with reference to FIGS. 29 to 31. For simple description, an image in which a left half is a black region having a luminance signal level of 1% and a right half is a white region having a luminance signal level of 100% is displayed as an example.

FIG. 29 is an example in which the partial driving of the backlight 208 is not performed. In the example illustrated in FIG. 29, an image is displayed on the entire screen under conditions that a gain of the backlight 208 is 100%, and the luminance signal levels of the left half and the right half of the liquid crystal display panel 207 are 1% and 100% respectively. Moreover, output electric power in a case where the backlight 208 illuminates the entire screen at 100% is a maximum of 400 W.

FIG. 30 is an example in which the partial driving of the backlight 208 is performed. In the example illustrated in FIG. 30, in order to display an image having the same luminance as that in FIG. 29, the level of the luminance signal is increased to decrease electric power of the backlight 208. Boosting up the luminance signal level of the left half of the liquid crystal display panel 207 to 100% decreases the gain of the left half of the backlight 208 to 1%. In contrast, the luminance signal level of the right half remains 100%, and the gain of the backlight 208 remains 100%. The electric power of the left half of the backlight 208 becomes 1%, thereby causing the entire eclectic power to become almost 200 W.

In this case, the entire electric power of the backlight 208 may be a maximum of 400 W or less. Accordingly, it is possible to use, for the right half of the backlight 208, surplus electric power obtained by saving electric power of the left half of the backlight 208, as illustrated in FIG. 31. In the example illustrated in FIG. 31, the luminance signal level of the left half of the liquid crystal display panel 207 is 100% and the gain of the left half of the backlight 208 is 1%. In contrast, the luminance signal level of the right half is 100%, but it is possible to boost up the gain of the backlight 208 to 200%. Accordingly, the dynamic range of luminance is improved about twice. Moreover, it is possible to cause the electric power of the entire backlight 208 not to exceed the maximum of 400 W.

Other configuration, operations, etc. may be substantially similar to those of the display apparatus according to the foregoing first or second embodiment.

4. Fourth Embodiment (Application Example)

The technology according to the present disclosure is applicable to various products. For example, the technology according to the present disclosure may be applied to a surgery room system. FIG. 32 is a view schematically depicting a general configuration of a surgery room system 5100 to which the technology according to an embodiment of the present disclosure can be applied. Referring to FIG. 32, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 32, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 32, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

FIG. 33 is a view depicting an example of display of an operation screen image on the centralized operation panel 5111. In FIG. 33, as an example, an operation screen image is depicted which corresponds to a case in which two display apparatus are provided as apparatus of an output destination in the surgery room system 5100. Referring to FIG. 33, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

FIG. 34 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates light at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 34) as depicted in FIG. 32. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139*a* to 5139*d* are used to puncture the abdominal wall. Then, a lens barrel 5117 of the endoscope 5115 and the other surgical tools 5131 are inserted into body lumens of the patient 5185 through the trocars 5139*a* to 5139*d*. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147*a*, 5147*b* and 5147*c* and links 5149*a* and 5149*b* and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is irradiated toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 32 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840×vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the display apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147a, 5147b and 5147c and the plurality of links 5149a and 5149b connected to each other by the joint portion 5147b. In FIG. 34, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are irradiated time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Functions of the camera head 5119 of the endoscope 5115 and the CCU 5153 are described in more detail with reference to FIG. 35. FIG. 35 is a block diagram depicting an example of a functional configuration of the camera head 5119 and the CCU 5153 depicted in FIG. 34.

Referring to FIG. 35, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5115 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display unit 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The technology according to the present disclosure is suitably applicable to the display apparatus 5103A to 5103D, the centralized operation panel 5111, or the display apparatus 5155. Moreover, the technology according to the present disclosure is suitably applicable to the audiovisual controller 5107 or the CCU 5153 (particularly the image processing unit 5175), and is particularly suitably applicable to a case where display based on the HDR image signal is performed in the display apparatus 5103A to 5103D, the centralized operation panel 5111, or the display apparatus 5155.

5. Other Embodiments

The technology according to the present disclosure is not limited to descriptions of the foregoing respective embodiments, and may be modified in a variety of ways.

The present technology may have the following configurations, for example.

(1)

An image signal processing device including a luminance correction section that performs, on a basis of information on a maximum output luminance value in a display section, luminance correction on an image signal to be supplied to the display section, the maximum output luminance value being variable.

(2)
The image signal processing device according to (1), further including a decoding section that performs decoding on the image signal with use of an electro-optical transfer function, in which the luminance correction section performs luminance correction on the image signal having been subjected to the decoding.

(3)
The image signal processing device according to (2), in which the luminance correction section performs luminance correction with use of a transfer function that is a result of multiplication of the electro-optical transfer function by a correction coefficient based on the information on the maximum output luminance value.

(4)
The image signal processing device according to (2), further including an encoding section that performs, on the image signal having been subjected to the decoding, gamma correction with use of an optical-electro transfer function,
in which the luminance correction section performs luminance correction on the image signal having been subjected to the gamma correction.

(5)
The image signal processing device according to (4), in which the luminance correction section performs luminance correction with use of a transfer function that is a result of multiplication of the optical-electro transfer function by a correction coefficient based on the information on the maximum output luminance value.

(6)
The image signal processing device according to (2), in which the luminance correction section performs, on the image signal having been subjected to the decoding, an OOTF process using a gamma value corrected on a basis of the maximum output luminance value.

(7)
The image signal processing device according to (2), further including:
a first color space conversion circuit that converts the image signal having been subjected to the decoding from first color space to second color space, and outputs the thus-converted image signal to the luminance correction section; and
a second color space conversion circuit that converts an image signal having been subjected to the luminance correction by the luminance correction section from the second color space to the first color space.

(8)
The image signal processing device according to (7), in which
the second color space is HSV color space including three components, that is, hue, saturation, and value, and
the luminance correction section performs luminance correction on a signal of the value.

(9)
The image signal processing device according to (8), in which the luminance correction section performs luminance correction using a look-up table.

(10)
The image signal processing device according to (7), in which
the second color space is YUV color space including a luminance signal and a color-difference signal, and
the luminance correction section performs luminance correction on at least the luminance signal.

(11)
The image signal processing device according to (10), further including a color correction section that performs correction on the color-difference signal on a basis of a ratio of a signal value of the luminance signal before being subjected to luminance correction and a signal value having been subjected to the luminance correction.

(12)
The image signal processing device according to (2), in which the luminance correction section includes a color gamut conversion section that performs, on the image signal having been subjected to the decoding, color gamut conversion on a basis of a color gamut conversion matrix multiplied by a correction coefficient based on the maximum output luminance value.

(13)
An image signal processing method including performing, on a basis of information on a maximum output luminance value in a display section, luminance correction on an image signal to be supplied to the display section, the maximum output luminance value being variable.

(14)
A display apparatus including:
a display section having a variable maximum output luminance value; and
a luminance correction section that performs, on a basis of information on the maximum output luminance value, luminance correction on an image signal to be supplied to the display section.

(15)
The display apparatus according to (14), in which
the display section includes
a backlight that includes a plurality of partial light emission regions and is subjected to lighting control to change driving electric power for each of the partial light emission regions, and
a display panel that is irradiated with illumination light from the backlight.

(16)
The display apparatus according to (14), in which the display section includes a plurality of self-light-emitting elements each having a variable drive current.

The present application is based on and claims priority from Japanese Patent Application No. 2015-152635 filed in the Japan Patent Office on Jul. 31, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. An image signal processing device comprising:
a luminance correction circuit that performs, on a basis of information on a maximum output luminance value in a display section coupled to the luminance correction circuit, luminance correction on an image signal that is used to control driving of the display section, the maximum output luminance value being variable;
drive circuitry coupled to the display section and that provides a luminance value used to calculate the maximum output luminance value provided to the luminance correction circuit; and
a decoder that performs decoding on the image signal with use of an electro-optical transfer function,
wherein the luminance correction circuit performs luminance correction on the image signal having been subjected to the decoding, and wherein the luminance correction circuit performs, on the image signal having been subjected to the decoding, an opto-optical transfer function (OOTF) process using a gamma value corrected on a basis of the maximum output luminance value.

2. The image signal processing device according to claim 1, wherein the luminance correction circuit performs luminance correction with use of a transfer function that is a result of multiplication of the electro-optical transfer function by a correction coefficient based on the information on the maximum output luminance value.

3. The image signal processing device according to claim 1, further comprising an encoder that performs, on the image signal having been subjected to the decoding, gamma correction with use of an optical-electro transfer function,
wherein the luminance correction circuit performs luminance correction on the image signal having been subjected to the gamma correction.

4. The image signal processing device according to claim 3, wherein the luminance correction circuit performs luminance correction with use of a transfer function that is a result of multiplication of the optical-electro transfer function by a correction coefficient based on the information on the maximum output luminance value.

5. The image signal processing device according to claim 1, further including:
a first color space conversion circuit that converts the image signal having been subjected to the decoding from first color space to second color space, and outputs the thus-converted image signal to the luminance correction section; and
a second color space conversion circuit that converts an image signal having been subjected to the luminance correction by the luminance correction section from the second color space to the first color space.

6. The image signal processing device according to claim 5, wherein
the second color space is HSV color space including three components, that is, hue, saturation, and value, and
the luminance correction circuit performs luminance correction on a signal of the value.

7. The image signal processing device according to claim 6, wherein the luminance correction circuit performs luminance correction using a look-up table.

8. The image signal processing device according to claim 5, wherein
the second color space is YUV color space including a luminance signal and a color-difference signal, and
the luminance correction circuit performs luminance correction on at least the luminance signal.

9. The image signal processing device according to claim 8, further comprising a color correction circuit that performs correction on the color-difference signal on a basis of a ratio of a signal value of the luminance signal before being subjected to luminance correction and a signal value having been subjected to the luminance correction.

10. The image signal processing device according to claim 1, wherein the luminance correction circuit includes a color gamut conversion circuit that performs, on the image signal having been subjected to the decoding, color gamut conversion on a basis of a color gamut conversion matrix multiplied by a correction coefficient based on the maximum output luminance value.

11. An image signal processing method comprising:
performing, using luminance correction circuitry, on a basis of information on a maximum output luminance value in a display section coupled to the luminance correction circuitry, luminance correction on an image signal that is used to control driving of the display section, the maximum output luminance value being variable;
providing, using drive circuitry coupled to the display section, a luminance value used to calculate the maximum output luminance value provided to the luminance correction circuit;
decoding on the image signal with use of an electro-optical transfer function;
performing luminance correction, using the luminance correction circuit, on the image signal subjected to the decoding; and
performing, using the luminance correction circuit, on the image signal subjected to the decoding, an opto-optical transfer function (OOTF) process using a gamma value corrected on a basis of the maximum output luminance value.

12. A display apparatus comprising:
a display section having a variable maximum output luminance value;
a luminance correction circuit coupled to the display section, the luminance correction circuit performs, on a basis of information on the maximum output luminance value, luminance correction on an image signal that is used to control driving of the display section;
drive circuitry coupled to the display section and that provides a luminance value used to calculate the maximum output luminance value provided to the luminance correction circuit; and
a decoder that performs decoding on the image signal with use of an electro-optical transfer function,
wherein the luminance correction circuit performs luminance correction on the image signal having been subjected to the decoding, and
wherein the luminance correction circuit performs, on the image signal having been subjected to the decoding, an opto-optical transfer function (OOTF) process using a gamma value corrected on a basis of the maximum output luminance value.

13. The display apparatus according to claim 12, wherein the display section includes
a backlight that includes a plurality of partial light emission regions and is subjected to lighting control to change driving electric power for each of the partial light emission regions, and
a display panel that is irradiated with illumination light from the backlight.

14. The display apparatus according to claim 12, wherein the display section includes a plurality of self-light-emitting elements each having a variable drive current.

* * * * *